(12) United States Patent
Nakahara

(10) Patent No.: US 11,915,128 B2
(45) Date of Patent: Feb. 27, 2024

(54) NEURAL NETWORK CIRCUIT DEVICE, NEURAL NETWORK PROCESSING METHOD, AND NEURAL NETWORK EXECUTION PROGRAM

(71) Applicant: Tokyo Artisan Intelligence Co., Ltd., Kanagawa (JP)

(72) Inventor: Hiroki Nakahara, Tokyo (JP)

(73) Assignee: TOKYO ARTISAN INTELLIGENCE CO., LTD., Kanagawa (JP)

( * ) Notice: Subject to any disclaimer, the term of this patent is extended or adjusted under 35 U.S.C. 154(b) by 757 days.

(21) Appl. No.: 17/055,600

(22) PCT Filed: May 8, 2019

(86) PCT No.: PCT/JP2019/018382
§ 371 (c)(1),
(2) Date: Nov. 15, 2020

(87) PCT Pub. No.: WO2019/220975
PCT Pub. Date: Nov. 21, 2019

(65) Prior Publication Data
US 2021/0224640 A1 Jul. 22, 2021

(30) Foreign Application Priority Data
May 15, 2018 (JP) .................. 2018-094184

(51) Int. Cl.
*G06N 3/063* (2023.01)
*G06F 7/50* (2006.01)
(Continued)

(52) U.S. Cl.
CPC .............. *G06N 3/063* (2013.01); *G06F 7/50* (2013.01); *G06N 3/048* (2023.01); *G06N 3/084* (2013.01)

(58) Field of Classification Search
CPC ........ G06N 3/063; G06N 3/048; G06N 3/084; G06F 7/50
See application file for complete search history.

(56) References Cited

U.S. PATENT DOCUMENTS 5,030,913 A * 7/1991 Byram ..................... G01V 3/15
702/194
10,083,375 B1 * 9/2018 Kim ........................ G06N 3/045
(Continued)

FOREIGN PATENT DOCUMENTS

JP 4-199259 7/1992
JP 2017-174039 9/2017

OTHER PUBLICATIONS

Japanese Patent Application No. 2018-094184 Notice of Reasons for Refusal (dated Aug. 2, 2022).
(Continued)

*Primary Examiner* — David E Choi
(74) *Attorney, Agent, or Firm* — CRGO Global; Steven M. Greenberg

(57) ABSTRACT

A tri-state neural network circuit includes, in an intermediate layer: an input value Xi to which convolution is applied; a nonzero convolution operation circuit configured to receive a weight Wi and to perform a convolution operation thereof; a sum circuit configured to take a sum of operation values each subjected to the convolution operation and a bias W0; and an activating function circuit configured to convert a signal Y generated by taking the sum, using an activating function f(u). The nonzero convolution operation circuit is configured to skip a weight Wi having a zero weight and to perform a convolution operation based on a nonzero weight and an input value Xi corresponding thereto.

18 Claims, 20 Drawing Sheets

(51) Int. Cl.
  *G06N 3/084* (2023.01)
  *G06N 3/048* (2023.01)

(56) References Cited

U.S. PATENT DOCUMENTS

| | | | | |
|---|---|---|---|---|
| 2013/0121548 | A1* | 5/2013 | Kovalan | G06T 15/08 382/128 |
| 2015/0202939 | A1* | 7/2015 | Stettner | B60R 21/36 701/45 |
| 2015/0309961 | A1* | 10/2015 | Ozaki | G06F 17/15 706/16 |
| 2015/0331832 | A1* | 11/2015 | Minoya | G06N 3/04 706/16 |
| 2015/0332126 | A1* | 11/2015 | Hikida | G06V 40/172 348/223.1 |
| 2017/0024632 | A1* | 1/2017 | Johnson | G06F 3/0644 |
| 2017/0053398 | A1* | 2/2017 | Mahoor | G06T 7/42 |
| 2017/0169327 | A1* | 6/2017 | Nestler | G06N 3/063 |
| 2017/0200063 | A1* | 7/2017 | Nariyambut Murali | G06V 10/764 |
| 2017/0206434 | A1* | 7/2017 | Nariyambut Murali | G06V 20/582 |
| 2017/0372202 | A1* | 12/2017 | Ginsburg | G06N 3/045 |
| 2018/0018553 | A1* | 1/2018 | Bach | G06V 10/454 |
| 2018/0121796 | A1* | 5/2018 | Deisher | G10L 15/16 |
| 2018/0204118 | A1* | 7/2018 | Ono | G06N 3/063 |
| 2019/0162868 | A1* | 5/2019 | Salman | G06N 3/045 |
| 2019/0332941 | A1* | 10/2019 | Towal | G06N 3/045 |
| 2019/0391295 | A1* | 12/2019 | Salman | G01V 99/005 |

OTHER PUBLICATIONS

Utsunomiya, FPGA accelerators for CNN using power approximation of 2, and pruning weights, IEICE Technical Report, pp. 119-124 (2018).
WO PCT/JP2019/018382 International Search Report.
Haruyoshi Yonekawa et al., Accelerated Ternarized Deep Neural Network by sparse matrix calculation, in IEICE Technical Report (May 22, 2017).
Haruyoshi Yonekawa et al, Ternary Weight Binary Input Convolutional Neural Network: Realization on the Embedded Processor, in 2018 IEEE 48th International Symposium (May 16, 2018).
Takahiro Utsunomiya et al., FPGA accelerator of CNN using Power of 2 Approximation and Pruning weights, in IEICE Technical Report (Jan. 18, 2018).
Eurpoean Extended Search Report, EPO, Appl 19803111.04 (dated Jul. 4, 2022).
Vivienne Sze et al: "Efficient Processing of Deep Neural Networks: A Tutorial and Survey", Proceedings of the IEEE., vol. 105, No. 12, Aug. 13, 2017 (Aug. 13, 2017).
Chenzhuo Zhu et al: "Trained Ternary Quantization", ICLR 2017 (Feb. 23, 2017).
Zhu Shien et al, TAB: Unified and Optimized Ternary, Binary and Mixed-Precision Neural Network Inference on the Edge, ACM Transactions on Embedded Computing Systems (Jan. 9, 1990).

* cited by examiner

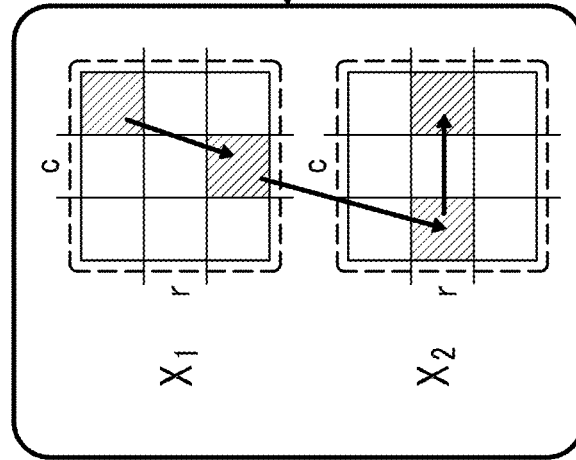

FIG. 8A  <Absolute Addressing>
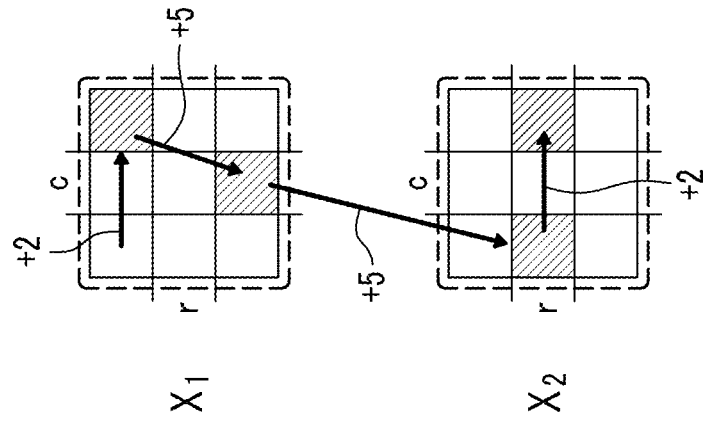
FIG. 8B  <Relative Addressing>
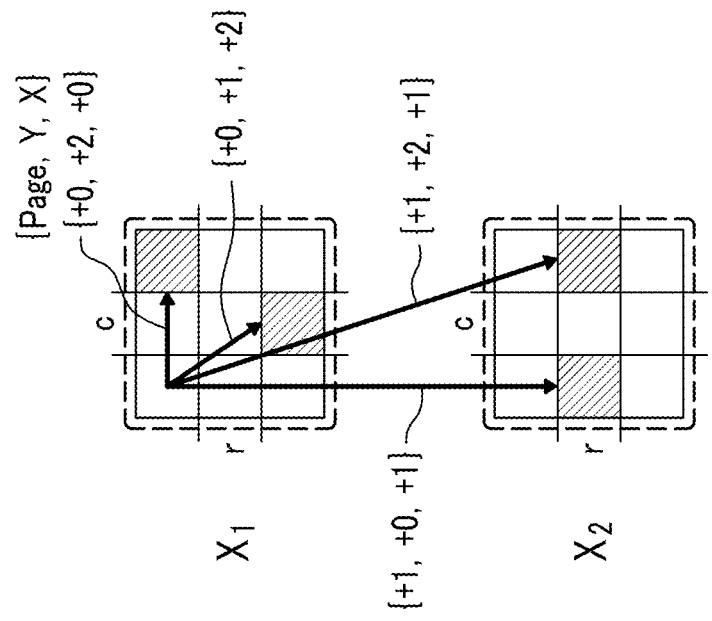

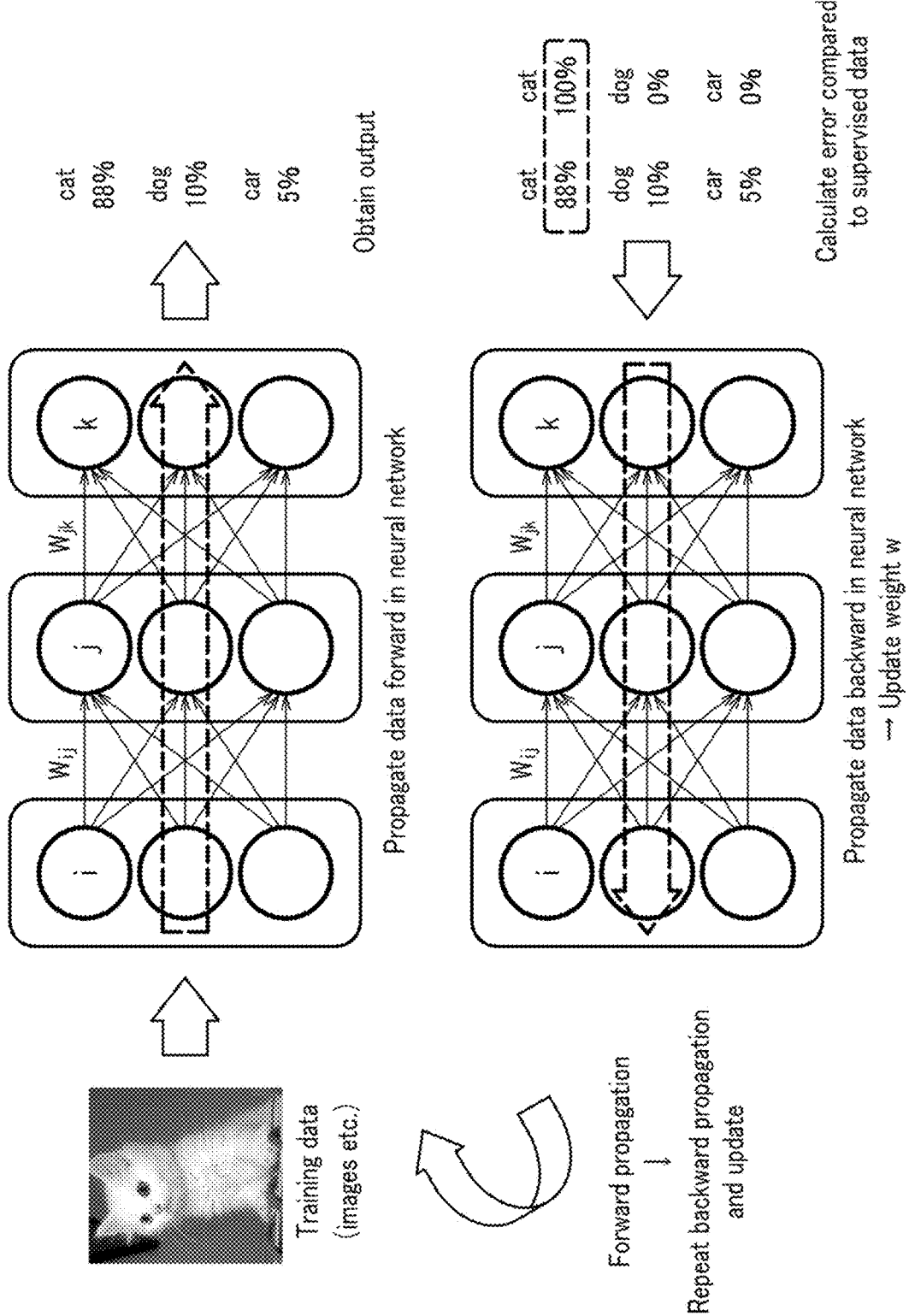

FIG. 19

| Platform | mCPU | mGPU | FPGA | This Embodiment |
|---|---|---|---|---|
| Device | Quad-core ARM Cortex-A57 | 256-core Pascal GPU | Zynq Ultra MPSoC | Zynq Ultra MPSoC |
| Clock Freq | 1.9GHz | 1.3GHz | 0.1GHz | 0.15GHz |
| Memory | 32GB eMMC Flash | 8GB LPDDR4 | 32.1Mb BRAM | 7.41Mb BRAM |
| Time[msec] (FPS)[sec$^{-1}$] | 4210.0 (0.23) | 715.9 (1.48) | 27.3 (36.50) | 18.9 (52.65) |
| Power[W] | 4.0 | 7.0 | 3.5 | 2.1 |
| Efficiency[FPS/W] | 0.057 | 0.211 | 10.42 | 25.07 |

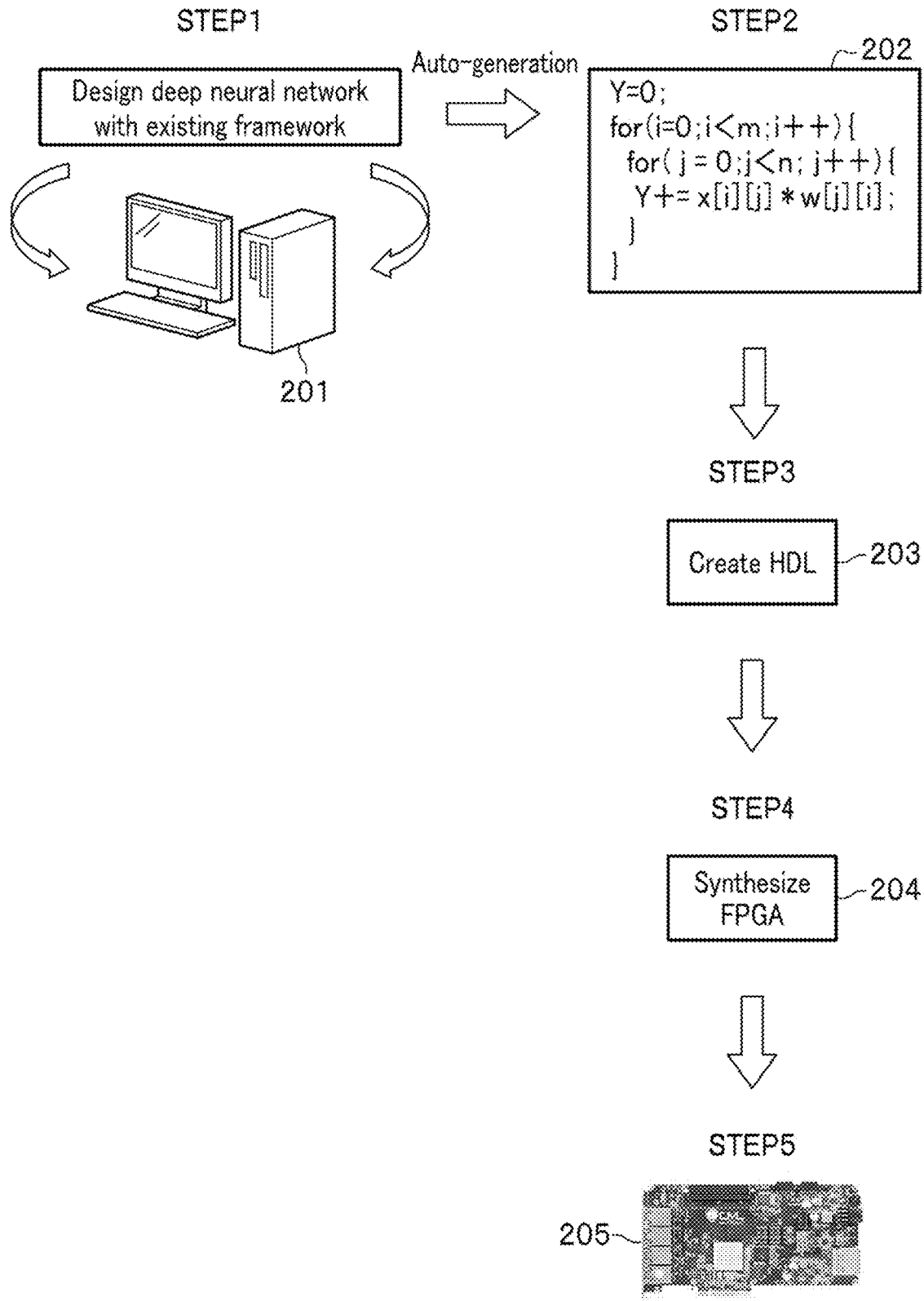

NEURAL NETWORK CIRCUIT DEVICE, NEURAL NETWORK PROCESSING METHOD, AND NEURAL NETWORK EXECUTION PROGRAM

CROSS REFERENCE TO RELATED APPLICATION

This application is a National Stage Application of PCT/JP2019/018382, filed on May 8, 2019, and which application is incorporated herein by reference. To the extent appropriate, a claim of priority is made to the above disclosed application.

TECHNICAL FIELD

The present invention relates to a technique of a neural network circuit device, a neural network processing method, and a neural network execution program.

BACKGROUND ART

Some examples of a conventional feedforward neural network (FFNN) include a RBF (Radial Basis Function) network, a normalized RBF network, and a self-organizing map. The RBF network uses a radial basis function as an activating function used in backpropagation. The RBF network has, however, such problems that: a large number of intermediate layers are not available therein and it is thus difficult to determine recognition with high accuracy; and that a scale of hardware becomes large and a processing takes a long time. The RBF network has been thus applied to limited fields such as handwriting recognition.

In recent years, a convolutional neural network (CNN) (a network which is not fully connected between one layer and another) and a recurrent neural network (bidirectional propagation) have been presented which become focus of attention as new techniques in areas of image recognition for ADAS (advanced driver assistance system), automatic translation, and the like. The CNN is composed of a deep neural network (DNN) to which a convolution operation is added.

Patent Document 1 discloses a processing part which solves a problem using an input signal and a value of a weight which is obtained by learning between loosely coupled nodes in a hierarchical neural network, based on a check matrix of error correction codes.

Patent Document 2 discloses an information processing apparatus that includes: a division unit configured to divide a weight parameter of a neural network into a plurality of groups; and an encoding unit configured to approximate the weight parameter in accordance with a codebook and encode the weight parameter for individual divided groups. Patent Document 2 also discloses that the weight parameter has elements of a binary value or a ternary value. Patent Document 2 describes that approximation can be performed with high accuracy on sparse weights such as weight parameters in higher layers of the CNN.

Machine learning application using a CNN requires in many cases a large quantity of calculations and a memory bandwidth. One of techniques to ease the requirement is to remove a zero coefficient, thus allowing a calculation having a zero coefficient to be skipped.

Patent Document 3 discloses a method for performing convolution that includes: (a) selecting, by an electronic device, a coefficient from a kernel as a current coefficient; (b) multiplying, by the electronic device, at least a part of an image by the current coefficient so as to obtain a set of products; and (c) adding, by the electronic device, the set of products to a set of accumulated sums, and that (a) through (c) are repeatedly performed in this order until all coefficients of the kernel are processed. Patent Document 3 also discloses that, when a coefficient is selected from a kernel, only a nonzero coefficient of the kernel is selected. Patent Document 3 describes that a combination of zero coefficient skipping and a novel convolution engine can lower both computation and memory bandwidth.

An existing CNN is constituted of a multiply-accumulate operation circuit with short accuracy (multibit) and requires a great number of multiplier circuits. This disadvantageously requires a large area and much power consumption. In view of the described above, a binarized accuracy, that is, a circuit in which the CNN is composed of only +1 and −1 (or only 0 and 1) has been proposed (see, for example, Non-Patent Documents 1 to 4 below).

RELATED ART DOCUMENTS

Patent Documents

Patent Document 1: Japanese Laid-Open Patent Application, Publication No. 2016-173843
Patent Document 2: Japanese Laid-Open Patent Application, Publication No. 2018-55260
Patent Document 3: Japanese Laid-Open Patent Application, Publication No. 2018-26134

Non-Patent Documents

Non-Patent Document 1: M. Courbariaux, I. Hubara, D. Soudry, R. E. Yaniv, Y. Bengio, "Binarized neural networks: Training deep neural networks with weights and activations constrained to +1 or −1," Computer Research Repository (CoRR), "Binary Neural Network Algorithm", [online], March 2016, [searched on Oct. 5, 2016], <URL: http://arxiv.org/pdf/1602.02830v3.pdf>
Non-Patent Document 2: Mohammad Rastegari, Vicente Ordonez, Joseph Redmon, Ali Farhadi, "XNOR-Net: ImageNet Classification Using Binary Convolutional Neural Networks," Computer Vision and Pattern recognition, "Binary Neural Network Algorithm", [online], March 2016, [searched on Oct. 5, 2016], <URL: https://arxiv.org/pdf/1603.05279v4>
Non-Patent Document 3: Hiroki Nakahara, Haruyoshi Yonekawa, Tsutomu Sasao, Hisashi Iwamoto and Masato Motomura, "A Memory-Based Realization of a Binarized Deep Convolutional Neural Network," Proc. of the 2016 International Conference on Field-Programmable Technology (FPT), Xi'an, China, December 2016 (To Appear).
Non-Patent Document 4: Eriko Nurvitadhi, David Sheffield, Jaewoong Sim, Asit Mishra, Ganesh Venkatesh, Debbie Marr, "Accelerating Binarized Neural Networks: Comparison of FPGA, CPU, GPU, and ASIC," Proc. of the 2016 International Conference on Field-Programmable Technology (FPT), Xi'an, China, December 2016 (To Appear).

SUMMARY OF THE INVENTION

Problem to be Solved by the Invention

A deep neural network having an increased number of neurons can have more functions and an improved recognition accuracy. Such a deep neural network requires, however, several billions to several tens of billions multiply-accumulate operations, which inevitably makes a large quantity of computing units and memory access necessary. Increase in the numbers of the computing units and memory access becomes a large obstacle to achieve a high-performance deep neural network. Development in microfabrication technique makes it possible to increase the number of computing units. In the meantime, it is extremely difficult to increase memory access due to physical limitation with respect to the number of substrate pins connected to an external substrate (implementation limit). There is thus a strong need for a deep neural network which can have a reduced amount of memory and can be implemented on chip.

In light of the background described above, the present invention has been made in an attempt to provide a neural network circuit device, a neural network processing method, and a neural network execution program, each of which can reduce an amount of memory and can be implemented on chip.

Means for Solving the Problems

In order to solve the problems described above, the neural network circuit device of the present invention provides a neural network circuit device including at least an input layer, one or more intermediate layers, and an output layer. The neural network circuit device includes, in the one or more intermediate layers: an input value Xi to which convolution is applied; a nonzero convolution operation circuit configured to receive an input of a weight Wi and to perform a nonzero convolution operation; a sum circuit configured to sum up each of values obtained by the nonzero convolution operation and a bias W0; and an activating function circuit configured to convert a signal Y generated by taking the sum, using an activating function f(u). The nonzero convolution operation circuit: skips a weight Wi having a zero weight; and performs a convolution operation based on a nonzero weight and an input value Xi corresponding thereto the nonzero weight.

Other means will be described below in embodiments for carrying out the present invention.

Advantageous Effects of the Invention

The present invention can provide a neural network circuit device, a neural network processing method, and a neural network execution program, each of which can reduce an amount of memory and can be implemented on chip.

BRIEF DESCRIPTION OF THE DRAWINGS

FIG. 4A is a diagram illustrating a circuit configuration thereof. FIG. 4B is a diagram illustrating an example of a skip of "0" therein.

FIG. 7A to FIG. 7C are each a diagram for explaining an indirect memory access in a deep neural network according to the embodiment. FIG. 7A is a diagram illustrating an example of a nonzero weight and a relative address stored in a weight/address memory. FIG. 7B is a diagram illustrating a nonzero weight w while skipping 0s. FIG. 7C is a diagram illustrating a readout of an input value X to which convolution is applied.

FIG. 8A and FIG. 8B are each a diagram for explaining how to express an indirect address in a deep neural network according to the embodiment. FIG. 8A is a diagram illustrating an absolute addressing method. FIG. 8B is a diagram illustrating a relative addressing method.

FIG. 12A is a diagram illustrating a configuration of the neural network circuit. FIG. 12B is a diagram for explaining how an amount of memory can be reduced.

FIG. 13A is a diagram illustrating a configuration of the neural network circuit. FIG. 13B is a diagram for explaining how an amount of memory can be reduced.

FIG. 14 is a diagram for explaining how a deep neural network learns according to Comparative Example.

FIG. 19 is a diagram for explaining a comparison between a tri-state neural network circuit in a deep neural network according to the embodiment and the object recognition algorithm YOLOv2.

FIG. 20 is a diagram for explaining an example of implementing the tri-state neural network circuit in the deep neural network according to the embodiment.

EMBODIMENTS FOR CARRYING OUT THE INVENTION

A deep neural network according to an embodiment for carrying out the present invention (which may also be simply referred to as "this embodiment" hereinafter) is described below with reference to related drawings.

<Explanation of Background>

Figure 1:
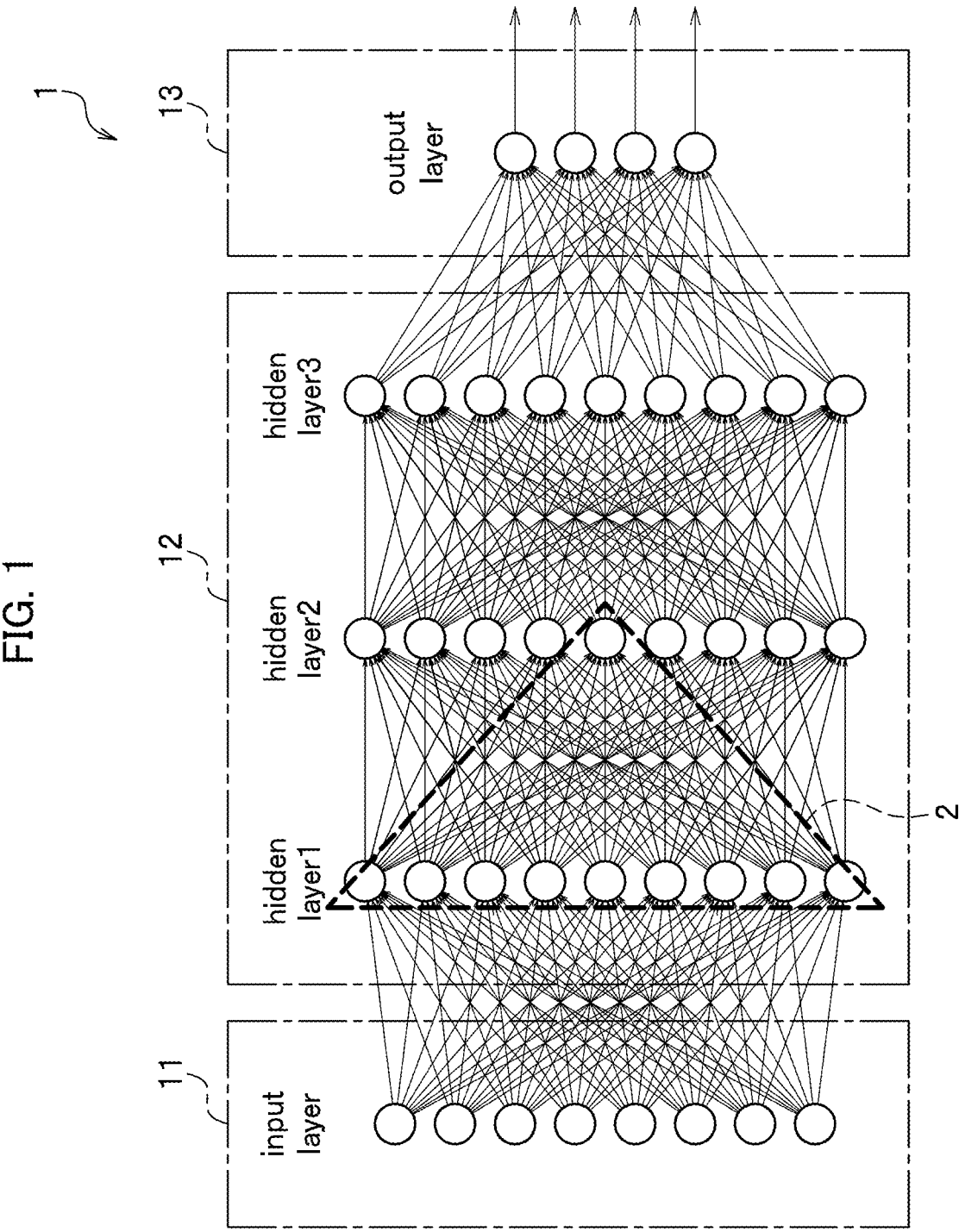
FIG. 1 is a diagram for explaining an example of a structure of a deep neural network (DNN).

FIG. 1 is a diagram for explaining an example of a structure of a deep neural network (DNN).

As illustrated in FIG. 1, a deep neural network (DNN) 1 includes: an input layer 11; a hidden layer 12 that is an intermediate layer and is provided in any number; and an output layer 13.

The input layer 11 includes a plurality of (eight, herein) input nodes (neurons). The number of the hidden layers 12 is more than one (three, herein (hidden layer1, hidden layer2, and hidden layer3)). Actually, however, a layer number n of the hidden layers 12 is, for example, as many as 20 to 100. The output layer 13 includes output nodes (neurons) as many as the number of objects to be recognized (four, herein). Note that each of the number of layers and the number of nodes (neurons) described above is given by way of example only.

In the deep neural network 1, each one of nodes in the input layer 11 is connected to each one of nodes in each one of the hidden layers 12, and each one of nodes in the hidden layers 12 is connected to each one of nodes in the output layer 13.

Each of the input layer 11, the hidden layer 12, and the output layer 13 includes any number of nodes (see marks o in FIG. 1). The node is a function which receives an input and outputs an appropriate value. The input layer 11 also includes a bias node in which a value independent and separate from that of the input node is put. A structure herein is established by putting one of the layers each including a plurality of nodes, on top of another. In propagation, a received input: is weighted; is converted using an activating function; and is outputted to a subsequent layer. Some examples of the activating function are a non-linear function such as a sigmoid function and a tanh function, and a ReLU (Rectified Linear Unit function). An increase in the number of nodes makes it possible to increase the number of variables to be dealt with and to thereby determine a value/boundary, taking a large number of factors into consideration. An increase in the number of layers makes it possible to express a combination of linear boundaries, or a complicated boundary. In learning, an error is calculated, based on which a weight of each layer is adjusted. Learning means solving an optimization problem such that an error becomes minimized. Backpropagation is generally used for solving the optimization problem. A sum of squared errors is generally used as an error. A regularization term is added to an error so as to enhance generalization ability. In backpropagation, an error is propagated from the output layer 13, and a weight of each layer is adjusted.

A CNN suitably used for image processing can be established by two-dimensionally developing a structure of the deep neural network 1 illustrated in FIG. 1. Additionally, by giving feedback to the deep neural network 1, a RNN (Recurrent Neural Network) can be constructed in which a signal is propagated bidirectionally.

As illustrated in a bold dashed triangle in FIG. 1, the deep neural network 1 is constructed by a circuit which achieves a multi-layer neural network (which will be referred to as a neural network circuit hereinafter) 2.

Techniques of the present invention are directed to the neural network circuits 2. How many neural network circuits 2 are applied to which position is not specifically limited. For example, when the layer number n of the hidden layers 12 is 20 to 30, the neural network circuit 2 may be applied to any position of any of the layers, and any node may serve as an input node or an output node. The neural network circuit 2 may be used not only in the deep neural network 1 but also in any other neural networks. In outputting a node into the input layer 11 or the output layer 13, however, the neural network circuit 2 is not used because not binary output but multibit output is required therein. Nevertheless, it does not cause a problem in terms of area, even if the multiplier circuit is left in a circuit constituting a node in the output layer 13.

Note that it is assumed herein that evaluation is performed to input data which has already been subjected to learning. This means that a weight Wi is already obtained as a result of the learning.

<Neural Network Circuit Having Nonzero Convolution Operation Circuit>

Figure 2:
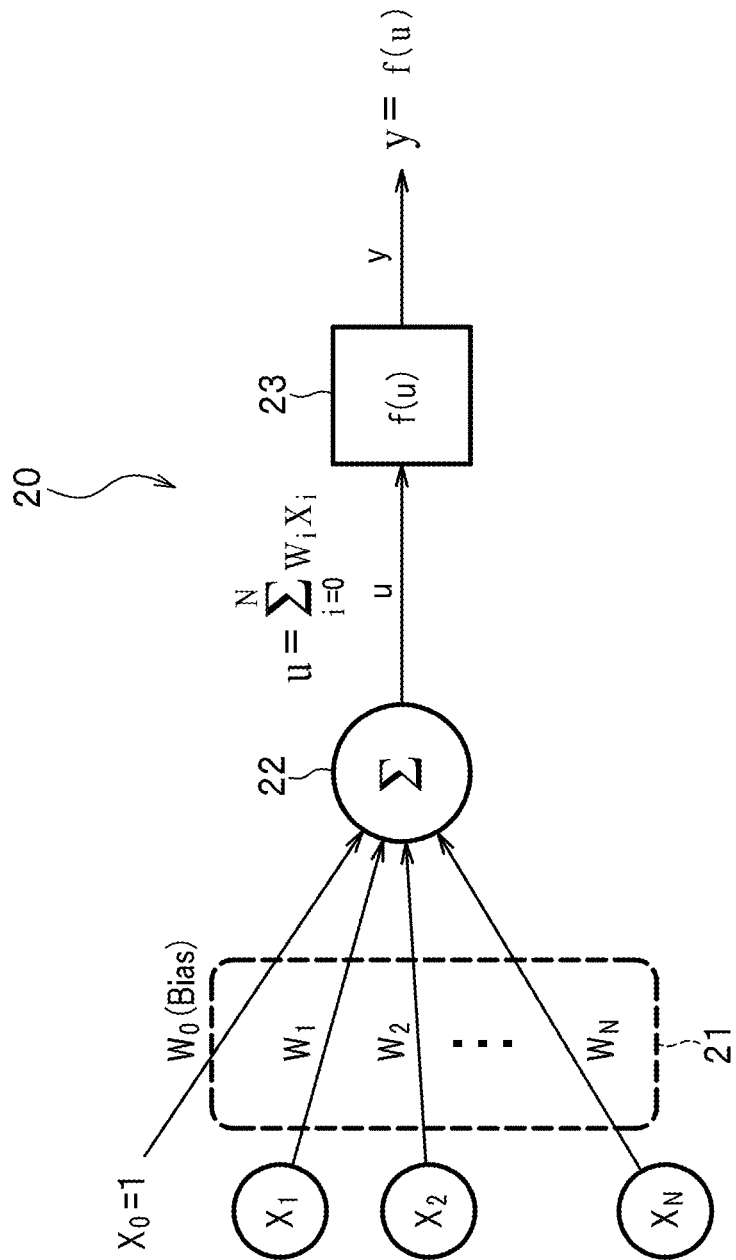
FIG. 2 is a diagram illustrating a configuration of a neural network circuit having therein a nonzero convolution operation circuit in a deep neural network according to an embodiment of the present invention.

FIG. 2 is a diagram illustrating a configuration of a neural network circuit 20 having therein a nonzero convolution operation circuit 21 according to an embodiment of the present invention, which is an example in which the neural network circuit 20 is applied to an artificial neuron (AN) model. Note that a zero used herein may also be shown as "0".

The neural network circuit 20 according to this embodiment can be applied to the neural network circuit 2 constituting the deep neural network 1 illustrated in FIG. 1.

The neural network circuit 20 includes: an input value Xi to which convolution is applied; a nonzero convolution operation circuit 21 (which may also be referred to as a convolution operation circuit) configured to receive an input of a weight Wi and to perform a nonzero convolution operation; a sum circuit 22 configured to sum up each of values obtained by the nonzero convolution operation and a bias W0; and an activating function circuit 23 configured to convert a signal Y generated by taking the sum, using an activating function f(u).

The neural network circuit 20 is an artificial neuron (AN) having a primitive operation in which a multiply-accumulate operation of an input value Xi and a weight Wi is performed.

Xi: Input signal (input value)

W0: Bias

Wi: Weight u: Internal state (intermediate value)

f(u): Activation function (for example, Sigmoid, ReLU, etc.)

y: Output signal (output value)

In the nonzero convolution operation circuit 21, when a weight Wi has a zero weight, the weight Wi is skipped, and a convolution operation is performed based on a nonzero weight and an input value Xi corresponding to the nonzero weight.

In the nonzero convolution operation circuit 21, when a tri-state {−multibit, 0, +multibit} weight Wi has a zero weight, the weight Wi is skipped, and a convolution operation is performed based on a nonzero weight and an input value Xi corresponding to the nonzero weight.

In the nonzero convolution operation circuit 21, if a ternary {−1, 0, +1} or a binary {−1, +1} weight Wi has a zero weight, the weight Wi is skipped, and a convolution operation is performed based on a nonzero weight and an input value Xi corresponding to the nonzero weight.

<State Expression Using Combination of Threshold ρ and Function f(u)>

In the present invention, a neural network in various states can be expressed using a combination of a weight threshold ρ and an activating function f(u), wherein ρ represents a threshold, and, Wi, a weight. When the weight Wi is ±1, such a neural network is referred to as a ternary neural network.

When the weight Wi is ±W (in multibit accuracy), such a neural network is referred to as a tri-state neural network.

(1) If $\rho=0$ and h(x) is sign(x) signum function, the neural network circuit 20 constitutes a binary neural network circuit.

[Formula 1]

$$W_i = \begin{cases} -1 & W_{hid} < 0 \\ +1 & 0 \leq W_{hid} \end{cases} \quad (1)$$

(2) If $\rho \neq 0$ and h(x) is sign(x) signum function, the neural network circuit 20 constitutes a ternary neural network circuit.

[Formula 2]

$$W_i = \begin{cases} -1 & W_{hid} < \rho \\ 0 & -\rho \leq W_{hid} < \rho \\ +1 & \rho \leq W_{hid} \end{cases} \quad (2)$$

(3) If $\rho \neq 0$ and h(x) is sign(x) signum function, the neural network circuit 20 constitutes a tri-state neural network circuit.

[Formula 3]

$$W_i = \begin{cases} W_{hid} & W_{hid} < \rho \\ 0 & -\rho \leq W_{hid} < \rho \\ W_{hid} & \rho \leq W_{hid} \end{cases} \quad (3)$$

wherein, Whid: multibit weight Wi, and $\rho$: threshold.

Especially when a combination of the threshold $\rho$ and the activating function f(u) as expressed above by Formula (3) is used, the nonzero convolution operation circuit 21 constitutes a tri-state convolution operation circuit. This makes the neural network circuit 20 constitute a tri-state neural network circuit.

When a combination of the threshold $\rho$ and the activating function f(u) as expressed above by Formula (2) is used, the nonzero convolution operation circuit 21 constitutes a ternary convolution operation circuit. This makes the neural network circuit 20 constitute a ternary neural network circuit.

The tri-state neural network circuit and the ternary neural network circuit described above are novel neural networks realized by the present invention.

<Comparison Between Tri-State Neural Network Circuit and Ternary Neural Network Circuit>

A ternary neural network circuit is area-saving and high-speed, compared with a binary {−1, +1} convolution operation circuit.

The ternary neural network circuit is an area-saving and high-speed circuit because a weight Wi thereof takes a low bit (−1, 0, 1). The ternary neural network circuit has, however, a limited use due to a low recognition accuracy thereof, compared with the tri-state neural network circuit.

A tri-state neural network circuit has a multibit weight Wi (for example, 8 to 16-bit±Wi and "0"); and thereby has a high recognition accuracy with a wide range of usage (applications). The tri-state neural network circuit has a recognition accuracy higher than that of the ternary neural network circuit. The tri-state neural network circuit requires, however, an area (in particular, an amount of memory) larger than that of the ternary neural network circuit. Additionally, the tri-state neural network circuit has a processing speed lower than that of the ternary neural network circuit.

Combinations as follows are available: a combination of a tri-state neural network circuit and a weighted ternary neural network circuit; and a combination of a tri-state neural network circuit and a weighted binary neural network circuit.

Though the ternary neural network circuit has a recognition accuracy lower than that of the tri-state neural network circuit and thus has a limited use, when used together with the tri-state neural network circuit, a processing speed can be made higher and an area can be reduced. Combining the tri-state neural network circuit with the ternary (or binary) neural network circuit makes it possible to achieve an AI circuit with a well-balanced relation between area and recognition accuracy.

<Nonzero Convolution Operation Circuit 21>

Figure 3:
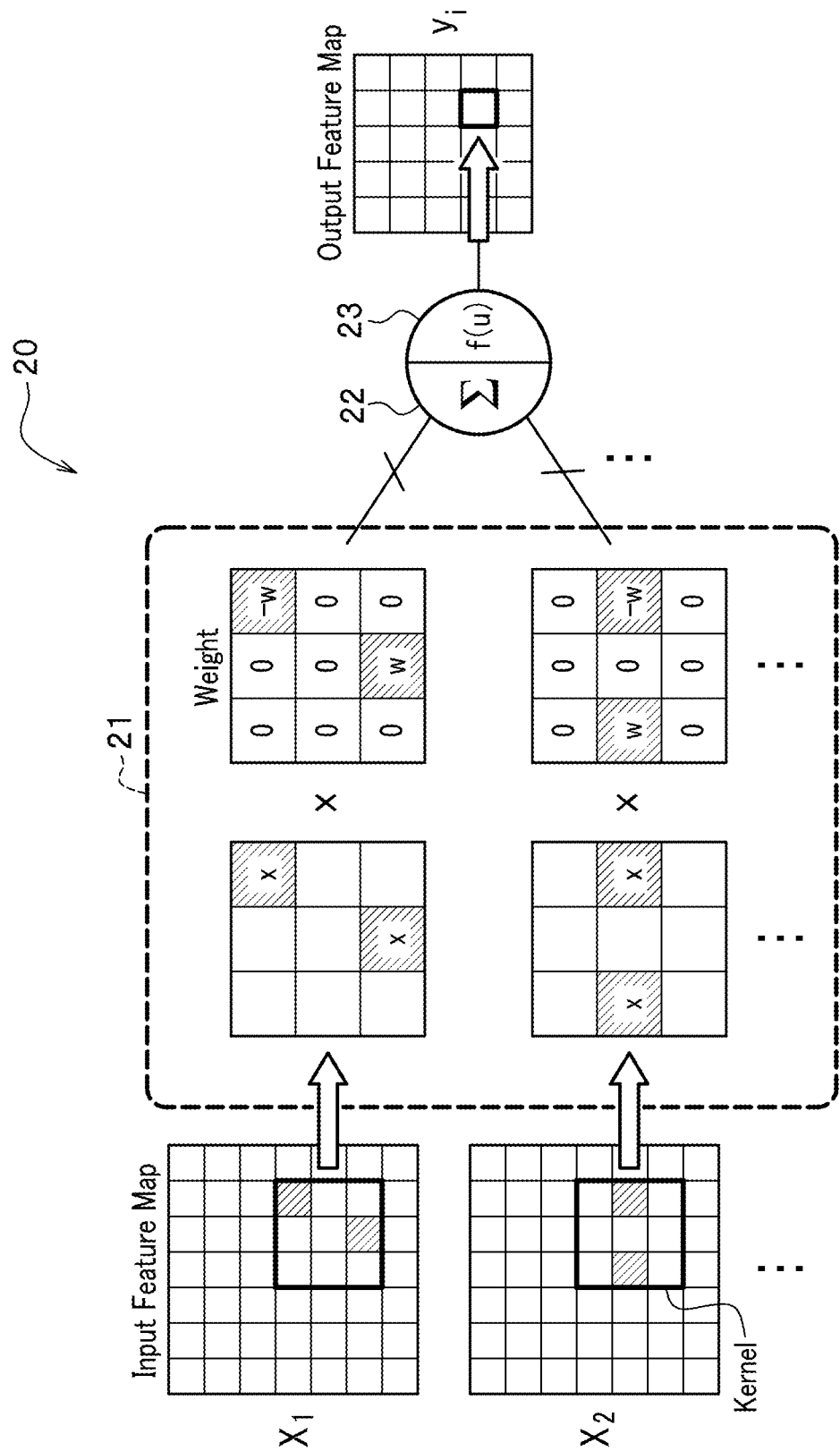
FIG. 3 is a diagram illustrating a concept of a convolution operation in the nonzero convolution operation circuit in the deep neural network according to the embodiment.

FIG. 3 is a diagram illustrating a concept of a convolution operation in the nonzero convolution operation circuit 21.

The nonzero convolution operation circuit 21 in a convolution network performs a tri-state {−W (multibit), 0, +W (multibit)} or a ternary {−1, 0, +1} convolution operation.

In detecting an object (dilated convolution), as illustrated in FIG. 3, the neural network circuit 20 including the nonzero convolution operation circuit 21 performs a convolution operation of an image data and a weighting function. For example, an image (each of elements of a matrix corresponds to a single pixel of the image) is inputted into an input feature map. Values in a kernel (K=3 in this example) are multiplied by values of a matrix for each element in the inputted image, and the resultant products are summed up. Such an operation is performed to each of the elements, while a kernel of interest is shifted from one to another, until a convolution operation is entirely performed.

As illustrated in FIG. 3, the nonzero convolution operation circuit 21 is configured to skip 0, if the number of "0s" is large in a weighting function (to be described hereinafter).

Deep learning has two phases, that is, learning and inference. Learning is typically performed using image data and voice data and determines an appropriate weight. Learned data is then converted in a device for inference (herein, bit size reduction and pruning (made to zero)). This means that a nonzero weight and a position thereof is known only after learning is terminated. After learning, when inference alone is performed, a position or a value is not updated. Note that when relearning is necessary, a position or a value is updated.

Figure 4A:
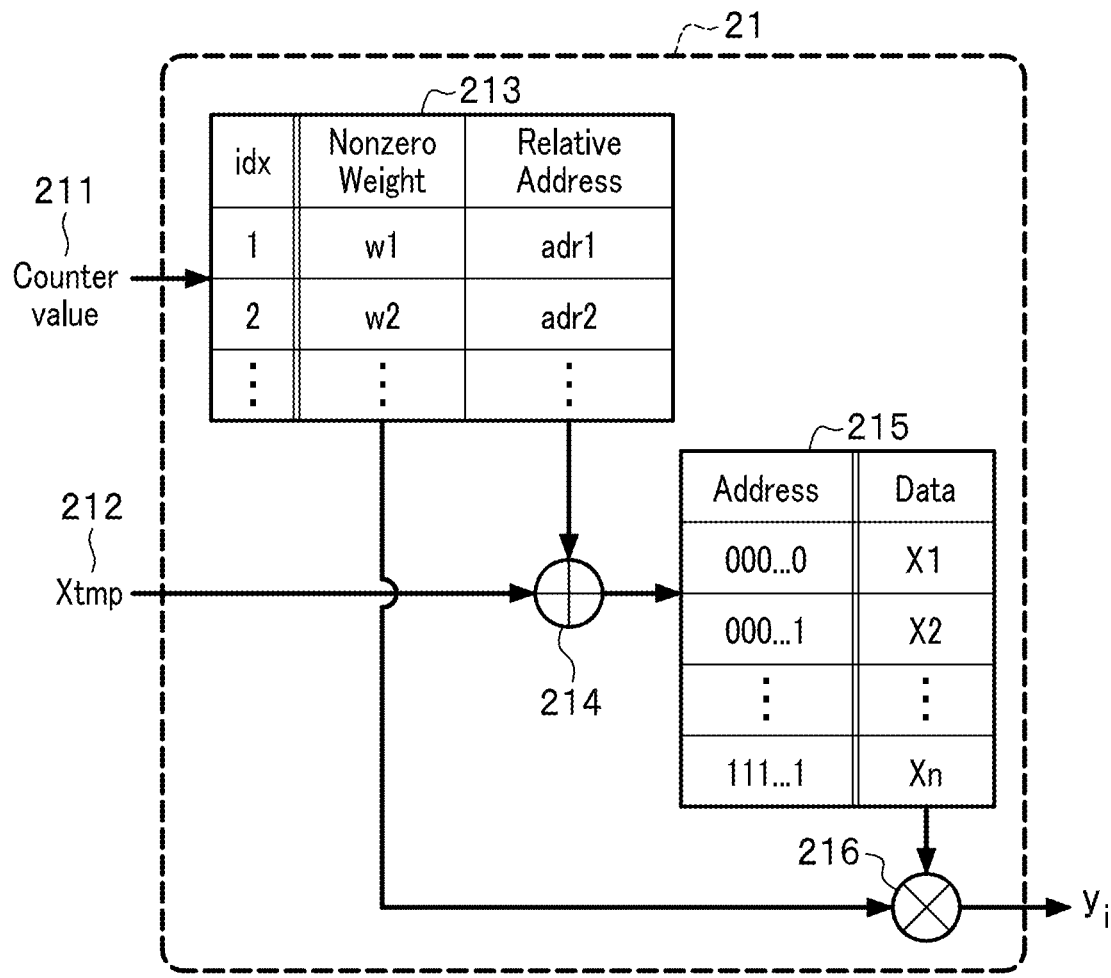
FIG. 4A and FIG. 4B are each a diagram illustrating a configuration of the nonzero convolution operation circuit in a deep neural network according to the embodiment.
Figure 4B:
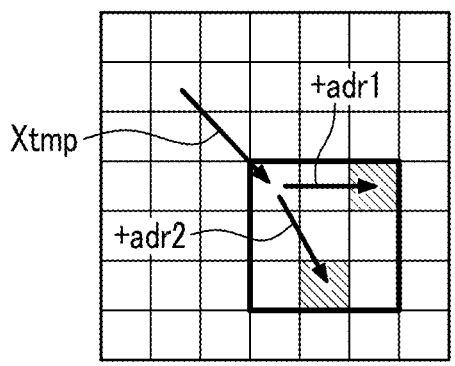

FIG. 4A and FIG. 4B are each a diagram illustrating a configuration of the nonzero convolution operation circuit 21. FIG. 4A is a circuit configuration diagram thereof. FIG. 4B is a diagram illustrating an example of a skip of "0" therein.

As illustrated in FIG. 4A, the nonzero convolution operation circuit 21 includes: a weight/address memory 213 (which may also be referred to as a first storage part) configured to store therein a nonzero weight and a relative address of an input value Xi to which convolution is applied; an adder 214; an address/data memory 215 (which may also be referred to as a second storage part) configured to store therein an address of the input value Xi; and an integration circuit 216.

In an operation in which a zero weight is skipped, the nonzero convolution operation circuit 21: reads a nonzero weight of interest and a relative address corresponding thereto from the weight/address memory 213; references the address/data memory 215 using the read relative address and a current address; thereby retrieves an input value Xi to which a subsequent convolution is applied; and performs a convolution operation based on the input value Xi retrieved from the address/data memory 215 and a nonzero weight corresponding thereto (see FIG. 8B).

More specifically, the weight/address memory 213 stores therein a nonzero weight w1, . . . and a relative address adr1, . . . , for each index idx. The weight/address memory 213 retrieves a nonzero weight Wi and a relative address adr of an index idx of interest in accordance with an inputted counter value. The adder 214: adds the relative address adr to a base address Xtmp; thereby creates an address; and outputs the created address to the address/data memory 215. As indicated by arrows in FIG. 4B, the nonzero convolution operation circuit 21 takes the base address Xtmp as a base point; and creates an address of each of relative addresses adr1, adr2, based on the base point.

The address/data memory 215 stores therein an address and a data corresponding thereto such as a data X1, . . . . The nonzero convolution operation circuit 21 retrieves a data corresponding to the data outputted from the adder 214 (an input value Xi), from the address/data memory 215.

The integration circuit 216: multiplies the nonzero weight Wi retrieved from the weight/address memory 213, by the input value Xi retrieved from the address/data memory 215; and outputs an obtained output value Yi.

As described above, the nonzero convolution operation circuit 21: specifies only a relative address having a nonzero weight, to thereby performs a convolution operation only where necessary by, for example, performing an operation to one relative address, and then jumping to another. That is, the nonzero convolution operation circuit 21 skips an unnecessary operation, only using a relative address having a nonzero weight.

As illustrated in FIG. 3 described above, the nonzero convolution operation circuit 21 multiplies a kernel value (an input value X to which convolution is applied) by a matrix value (a nonzero weight w) for each element, while skipping "0s".

Taking advantage of a feature that a weighting function of performing a convolution operation is sparse (has many zeros), a circuit configuration is structured such that a relative address of a zero is displayed and only an element having a nonzero weight is subjected to an operation processing. This can achieve a high-speed calculation time and a reduction in memory area.

In this embodiment, optimization of learning makes a 90% to 95% skip possible.

The nonzero convolution operation circuit 21 includes a memory (which may also be referred to as a third storage part) (not illustrated) configured to store therein a nonzero weight and an absolute address of an input value Xi to which convolution is applied. In a computation in which a nonzero weight is skipped, the nonzero convolution operation circuit 21: specifies an absolute address of interest from the memory; retrieves a nonzero weight and an input value Xi each corresponding thereto; and performs a convolution operation based on the retrieved input value Xi and the corresponding nonzero weight (see FIG. 8A).

[Configuration of this Embodiment]
<Tri-State Neural Network Circuit 200>

Figure 5:
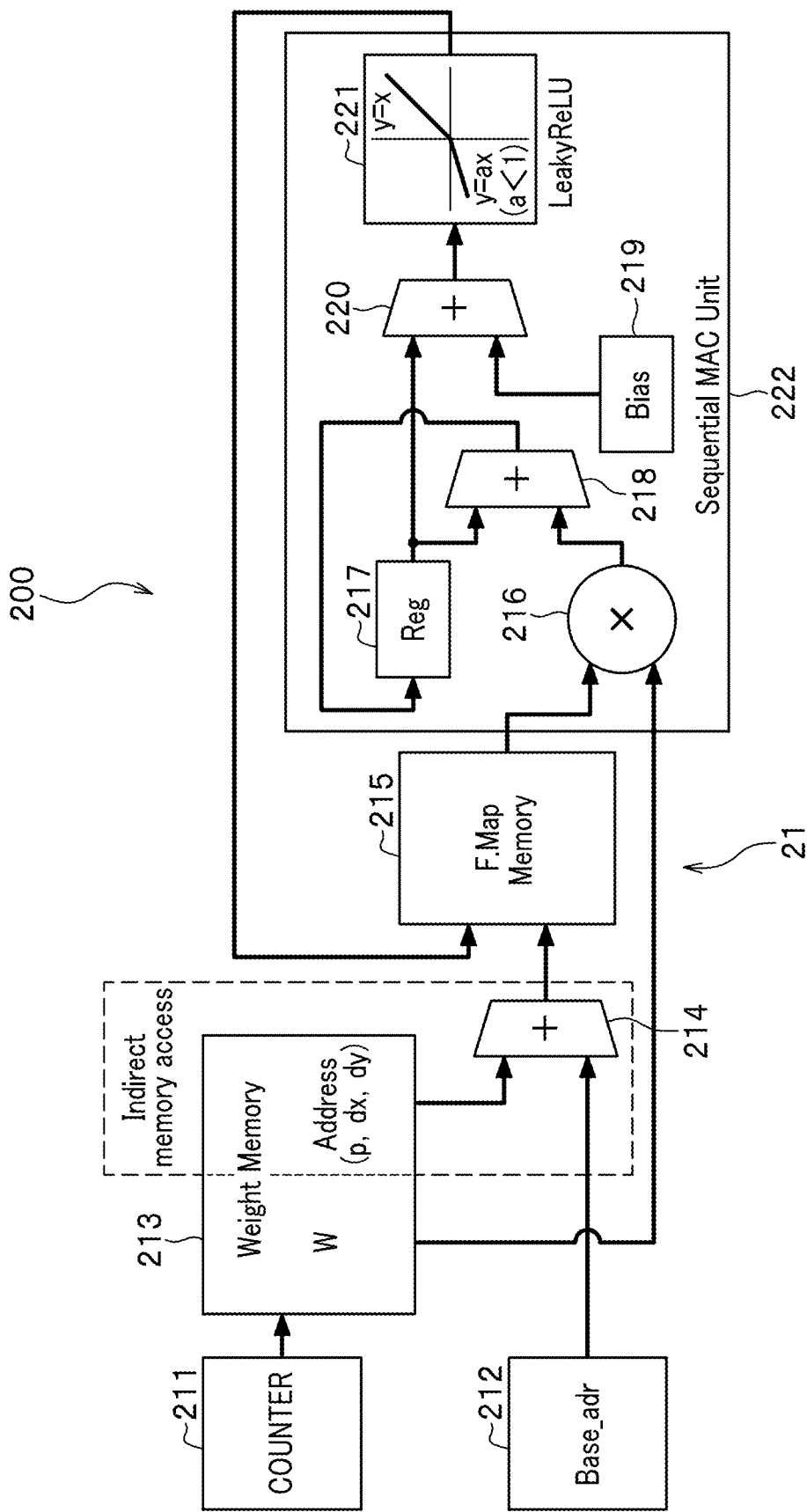
FIG. 5 is a diagram illustrating a configuration of a tri-state neural network circuit in a deep neural network according to the embodiment.

FIG. 5 is a diagram illustrating a configuration of a tri-state neural network circuit 200 in a neural network according to the embodiment of the present invention. The same reference numerals are given to the structural elements same as those illustrated in FIG. 4A.

The tri-state neural network circuit 200 according to this embodiment provides a technology for implementation on a deep neural network.

The tri-state neural network circuit 200 (which may also be referred to as a neural network circuit device) can be applied to the neural network circuit 2 illustrated in FIG. 1.

As illustrated in FIG. 5, the tri-state neural network circuit 200 includes: a counter 211 configured to output a counter value; a register 212 configured to output a base address; a weight/address memory 213; an adder 214; an address/data memory 215; an integration circuit 216; a register 217; an adder 218; a register 219 configured to output a bias value; an adder 220; and an activating function circuit 221A.

The adder 216, the register 217, the adder 218, the register 219, the adder 220, and the activating function circuit 221A described above are included in a sequential MAC unit 222.

The counter 211, the register 212 configured to output a base address, the weight/address memory 213, the adder 214, the address/data memory 215, and the integration circuit 216 constitute the nonzero convolution operation circuit 21.

The tri-state neural network circuit 200 has a three-state (tri-state) {−w, 0, +w} convolution operation circuit (the nonzero convolution operation circuit 21).

The activating function circuit 221 uses Leaky ReLU signum function.

An indirect memory access (see a portion encircled by dashed line of FIG. 5) is used in part of the weight/address memory 213 and the adder 214 (to be described later with reference to FIG. 11).

The nonzero convolution operation circuit 21 in the tri-state neural network circuit 200 makes it possible to speed up a calculation time and reduce memory area. In the conventional technology, on-chip arrangement has been extremely difficult. This embodiment provides the nonzero convolution operation circuit 21, thus allowing an on-chip arrangement to be implemented by drastically reduce an absolute number of multiply-accumulate operations in a convolution operation.

<Ternary Neural Network Circuit 200A>

Figure 6:
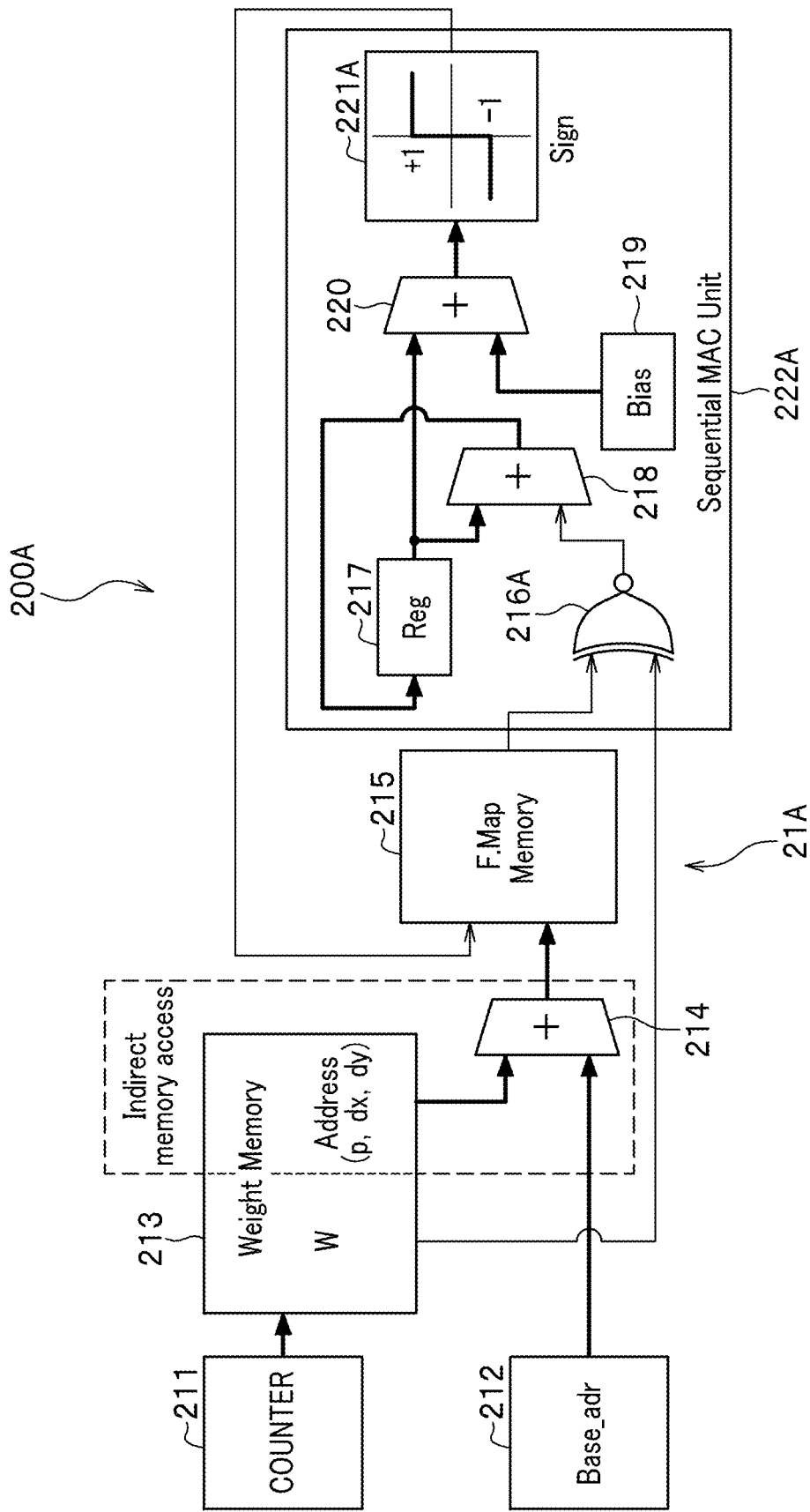
FIG. 6 is a diagram illustrating a configuration of a ternary neural network circuit in a deep neural network according to the embodiment.

FIG. 6 is a diagram illustrating a configuration of the ternary neural network circuit 200A in a neural network according to the embodiment of the present invention. The same reference numerals are given to the structural elements same as those illustrated in FIG. 4.

Similarly to the tri-state neural network circuit 200, the ternary neural network circuit 200A according to this embodiment provides a technology for implementation on a deep neural network. The ternary neural network circuit 200A can be suitably used together with the tri-state neural network circuit 200.

The ternary neural network circuit 200A (which may also be referred to as a neural network circuit device) can be applied to the neural network circuit 2 illustrated in FIG. 1.

As illustrated in FIG. 6, the ternary neural network circuit 200A includes: the counter 211 configured to output a counter value; the register 212 configured to output a base address; the weight/address memory 213; the adder 214; the address/data memory 215; a plurality of XNOR gate circuits 216A configured to take a XNOR (Exclusive NOR) logic; the register 217; the adder 218; the register 219 configured to output a bias value; the adder 220; and the activating function circuit 221A.

The XNOR gate circuit 216A; the register 217; the adder 218; the register 219; the adder 220; and the activating function circuit 221A described above are included in a sequential MAC unit 222A.

The counter 211, the register 212 configured to output a base address, the weight/address memory 213, the adder 214, the address/data memory 215, and the XNOR gate circuit 216A constitutes the nonzero convolution operation circuit 21A.

The ternary neural network circuit 200A includes a ternary {-1, 0, +1} convolution operation circuit (the nonzero convolution operation circuit 21A).

The ternary neural network circuit 200A includes, instead of the integration circuit 216 (see FIG. 5), the XNOR gate circuit 216A configured to realize a XNOR logic. This makes it possible to reduce an area which is otherwise required to construct the integration circuit 216. Also, because a weight Wi is ternary {-1, 0, +1}, an amount of memory can be significantly reduced and a memory bandwidth can be improved, compared with being tri-state which is multivalued.

The activating function circuit 221A use a signum function Sign(x).

An indirect memory access (see a portion encircled by dashed line of FIG. 6) is introduced in a part of the weight/address memory 213 and the adder 214 (to be described later with reference to FIG. 11). Introduction of the indirect memory access allows "0" skipping to be achieved.

<Indirect Memory Access>

Next is described an indirect memory access.

FIG. 7A to FIG. 7C are each a diagram for explaining an indirect memory access according to the embodiment. FIG. 7A is a diagram illustrating an example of a nonzero weight and a relative address stored in the weight/address memory 213. FIG. 7B is a diagram illustrating a nonzero weight w with 0s being skipped. FIG. 7C is a diagram illustrating a readout of an input value X to which convolution is applied.

As illustrated in FIG. 7A, the weight/address memory 213 stores therein, for each of IDs, a nonzero weight W (w1, . . . ) and an index L for specifying a corresponding relative address (adr1, . . . ).

The index L specifies an input feature map (an inputted image), a row, and a column.

The indirect memory access illustrated in FIGS. 7A to 7C, the following 1. and 2. are performed.
1. Read a weight of interest and a relative address corresponding thereto; and
2. Retrieve an input value Xi to which convolution is applied, based on the relative address and a current address.

<Expression of Indirect Address>

Next is described how to express an indirect address.

FIG. 8A and FIG. 8B are each a diagram illustrating how to express an indirect address. FIG. 8A is a diagram illustrating an absolute addressing method. FIG. 8B is a diagram illustrating a relative addressing method.

As illustrated in FIG. 8A, in the absolute addressing method, an absolute address is specified using {page, Y, X}. In this example, an original absolute address (0, 0) illustrated in FIG. 8A is used as a base point, based on which an address expressed by {page, Y, X} is specified. For example, as indicated by an arrow in FIG. 8A, taking the original absolute address (0, 0) as a base point, {+0, +2, +0} is specified to thereby obtain a value of an absolute address (2, 0) (see a shaded portion in FIG. 8A). Similarly to the described above, as indicated by another arrow in FIG. 8A, taking the absolute address (0, 0) as the base point, {+1, +2, +1} is specified to thereby obtain a value of an absolute address (2, 1) of an image data on the next page (see another shaded portion in FIG. 8A).

In the absolute addressing method, even when a memory value is garbled during an operation, a calculation can be correctly performed. Note that, however, an absolute address is lengthy in the absolute addressing method, and an increased amount of memory is thus necessary, compared with the relative address method.

As illustrated in FIG. 8B, in the relative addressing method, a next address is specified by a relative value. For example, as indicated by an arrow in FIG. 8B: an original address (a base address) (0, 0) is taken as a base point; and +2 is specified to thereby obtain a value of a next address (1, 3) (see a shaded portion in FIG. 8B). Then, +5 is specified to thereby obtain a value of a next address (3, 2); and +5 is further specified to thereby obtain a value (2, 1) of an image on the next page.

In the relative addressing method, a relative value is simply stored therein, which can reduce an amount of memory, compared with the absolute addressing method. In the relative addressing method, however, when a memory value is garbled during an operation for some reason, calculation cannot be correctly performed.

In this embodiment, in an attempt to reduce an amount of memory, a relative addressing method is used in a zero-skipping operation. In the nonzero convolution operation circuit 21 illustrated in FIG. 4, using the relative addressing method; a relative address adr is retrieved from the weight/address memory 213; Xtmp's are sequentially added up in the adder 214; and a subsequent address is specified.

<Application to Convolutional Neural Network>

Next is described an application to a convolutional neural network.

Figure 9:
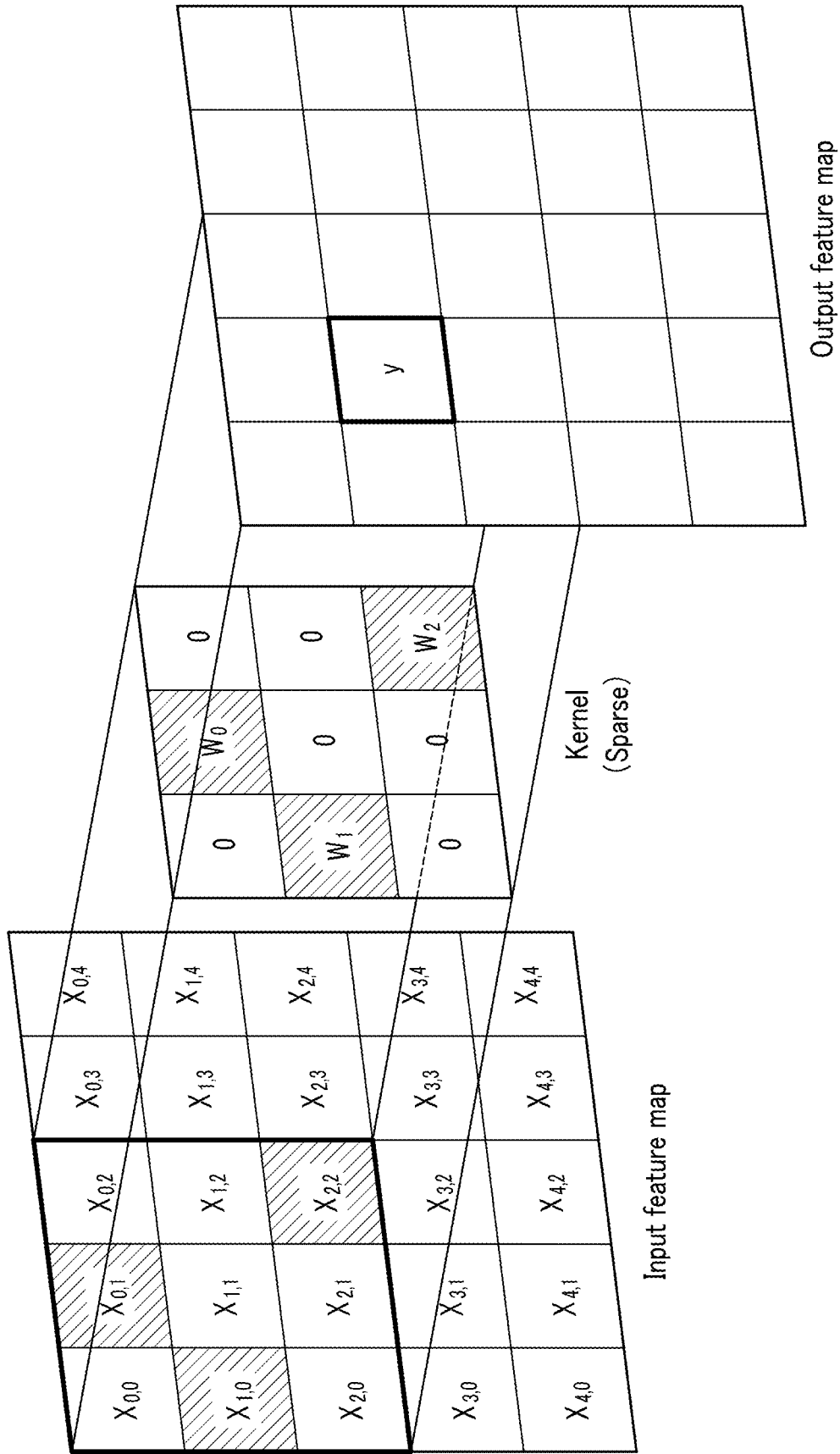
FIG. 9 is a diagram for explaining an application to a convolutional neural network in a deep neural network according to the embodiment.
Figure 10:
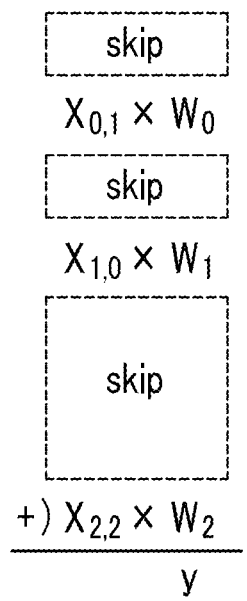
FIG. 10 is a diagram for explaining an advantageous effect of a zero-skipping operation in a deep neural network according to the embodiment.

FIG. 9 is a diagram for explaining an application to a convolutional neural network. FIG. 10 is a diagram for explaining advantageous effects of a zero-skipping operation.

As illustrated in FIG. 9, a convolutional neural network includes: an input feature map; a kernel (sparse); and an output feature map.

The tri-state neural network circuit 200 (see FIG. 5) is applied to the convolutional neural network.

The tri-state neural network circuit 200 includes, as described above, the nonzero convolution operation circuit 21 configured to perform a zero-skipping operation.

Introducing a zero-skipping operation makes it possible to skip operations encircled by dashed lines in FIG. 10. This can drastically reduce an absolute number of multiply-accumulate operations in a convolution operation, thus allowing a reduction in an amount of memory and a high-speed calculation time.

The ternary neural network circuit 200A (see FIG. 6) may be applied to the convolutional neural network illustrated in FIG. 9. In this case, the ternary neural network circuit 200A uses a ternary {-1, 0, +1}, thus allowing a significant reduction in an amount of memory, compared with the tri-state neural network circuit 200 which is multivalued.

<Zero-Skipping Operation; Indirect Memory Access>

Next is described a zero-skipping operation, that is, an indirect memory access.

Figure 11:
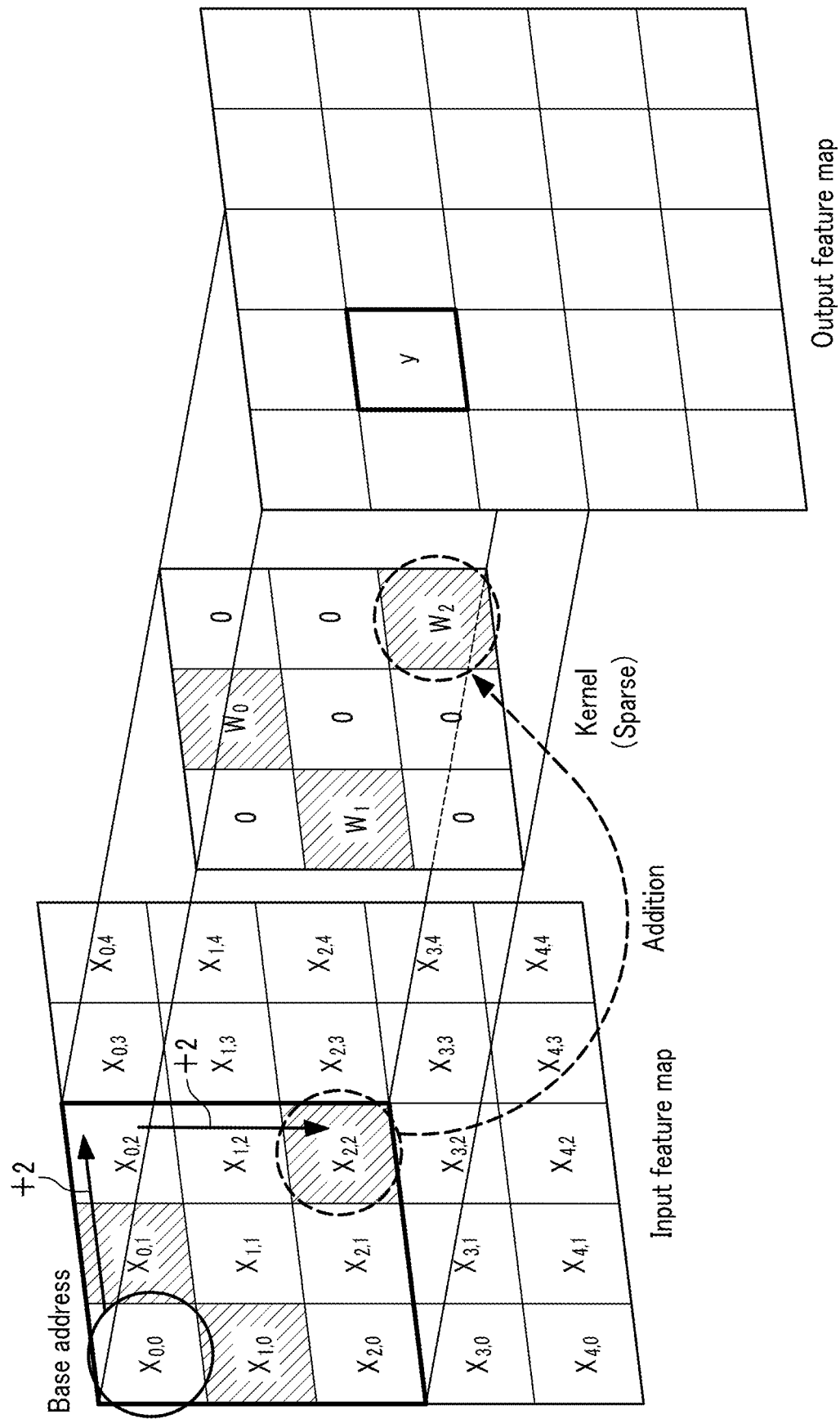
FIG. 11 is a diagram for explaining is a diagram for explaining an indirect memory access in a deep neural network according to the embodiment.

FIG. 11 is a diagram for explaining a zero-skipping operation; an indirect memory access. Description herein is made assuming an example in which the indirect memory access illustrated in FIGS. 7A to 7C and FIG. 8A is applied to the convolutional neural network illustrated in FIG. 9.

As described above, 0s are skipped in an attempt to reduce an amount of memory and speed up a processing.

In this embodiment, an indirect memory access with two memory accesses using relative addresses. More specifically, the following is performed as illustrated in FIG. 11.
1. The first memory access reads a relative value as indicated by a solid arrow in FIG. 11.
2. Calculate an input address having a nonzero weight, based on a base address and the relative value.
3. The second memory access reads an input value, based on the calculated address.
4. Perform an addition (a neural network operation) as indicated by a dashed arrow in FIG. 11.

<How an Amount of Memory can be Reduced>

Next is described how an amount of memory can be reduced.

Figure 12A:
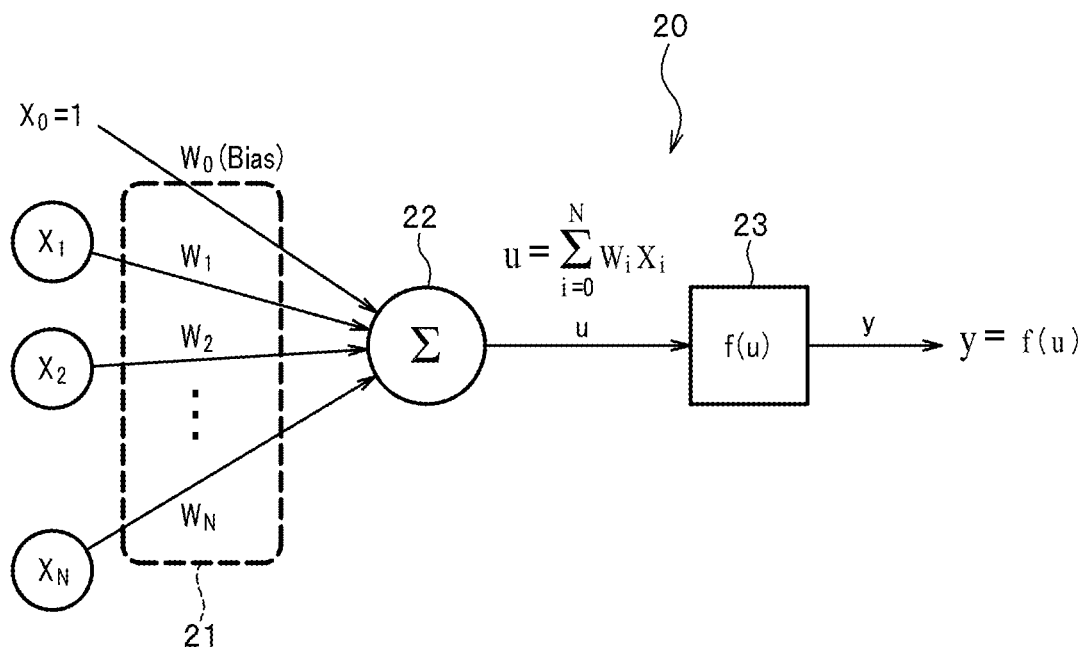
FIG. 12A and FIG. 12B are each a diagram for explaining an example in which an amount of memory is reduced by reducing a bit accuracy in a deep neural network according to the embodiment.
Figure 12B:
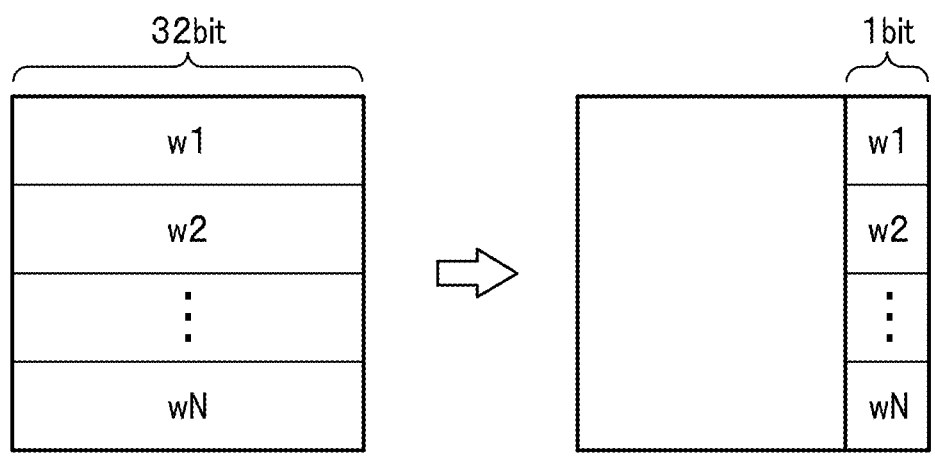

FIG. 12A and FIG. 12B are each a diagram for explaining an example in which an amount of memory is reduced by reducing a bit accuracy. FIG. 12A is a diagram illustrating a configuration of the neural network circuit 20 (see FIG. 2). FIG. 12B is a diagram for explaining how an amount of memory can be reduced.

The nonzero convolution operation circuit 21 in the neural network circuit 20 illustrated in FIG. 12A reduces the number of bits, for example, from a 32-bit accuracy to a 1-bit accuracy {−1, +1}.

This makes it possible to reduce an amount of memory as illustrated in FIG. 12B.

Figure 13A:
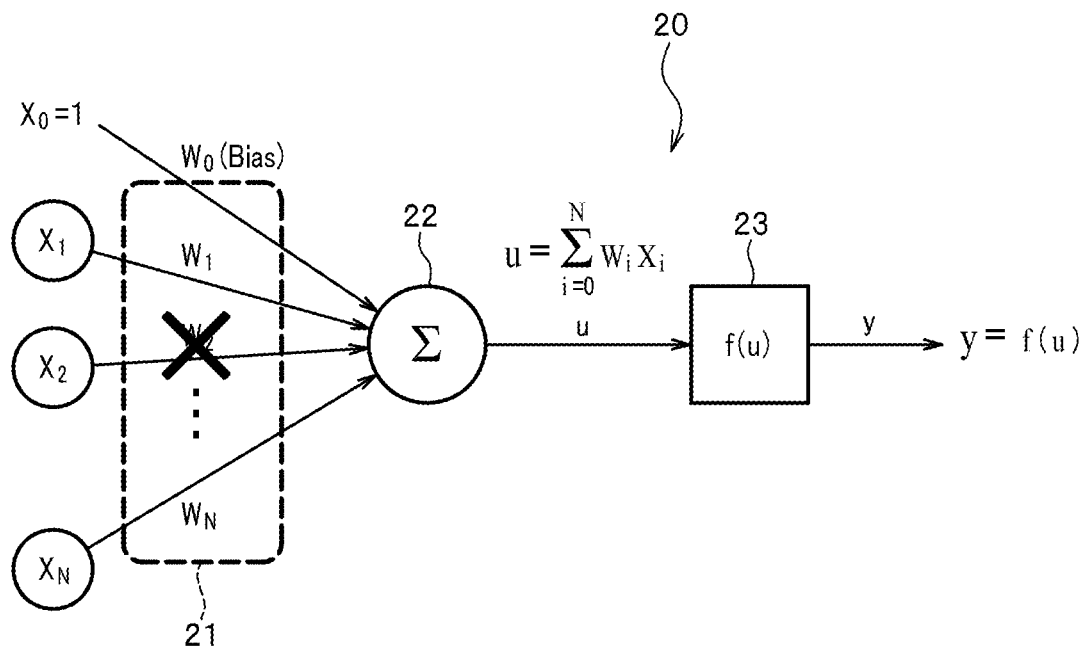
FIG. 13A and FIG. 13B are each a diagram for explaining an example in which a zero-skipping operation reduces an amount of memory in a deep neural network according to the embodiment.
Figure 13B:
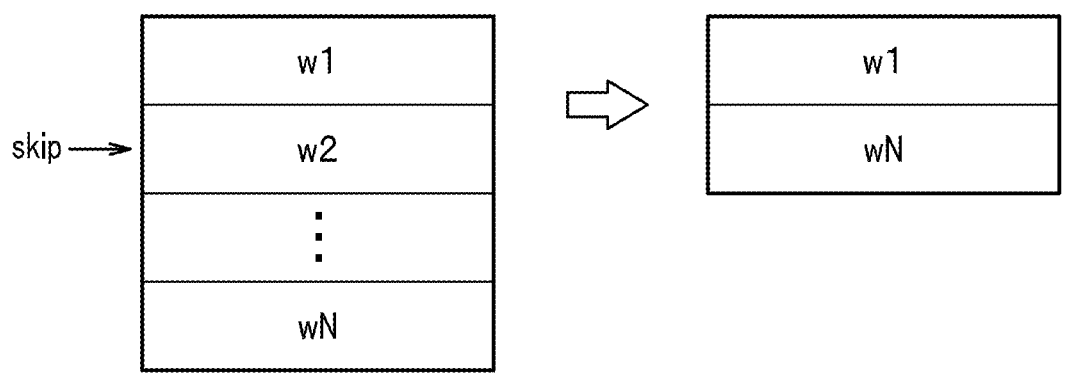

FIG. 13A and FIG. 13B are each a diagram for explaining an example in which a zero-skipping operation reduces an amount of memory. FIG. 13A is a diagram illustrating a configuration of the neural network circuit 20 (see FIG. 2). FIG. 13B is a diagram for explaining how an amount of memory can be reduced.

As indicated by "x" in FIG. 13A, the nonzero convolution operation circuit 21 of the neural network circuit 20 skips over zeros (herein, skips over a multiplication of a weight w2). That is, zeros are skipped because the zero property of multiplication is known. This makes it possible to reduce an amount of memory and speed up a processing.

The neural network circuit 20 described above is the tri-state neural network circuit 200 (see FIG. 5) in which a tri-state (0, ±multibit) convolution operation is performed. The tri-state neural network circuit 200 performs a low bit operation (the reduction in an amount of memory illustrated in FIG. 12) together with a zero-skipping operation (another reduction in an amount of memory illustrated in FIG. 13), thus allowing an amount of memory to be further reduced.

[How Deep Neural Network Learns According to this Embodiment]

Next is described how a deep neural network learns, comparing Comparative Example with the tri-state neural network circuit 200 according to this embodiment.

Comparative Example

FIG. 14 is a diagram for explaining how a deep neural network learns according to Comparative Example.

As illustrated in an upper section of FIG. 14, the deep neural network according to Comparative Example propagates training data (images in many cases) forward in a neural network, using the error back propagation algorithm; and obtains an output from the neural network such as "a cat: 88%, a dog: 10%, and a car: 5%".

As illustrated in a lower section of FIG. 14, the deep neural network according to Comparative Example: allows an input of a supervised data such as "the cat: 100%, the dog: 0%, and the car: 0%; and calculates an error compared with the output in the forward propagation. An error compared with the supervised data is inputted into an output layer of the deep neural network and is propagated backward in the neural network, while the weight Wi is updated.

The forward and backward propagations and the update of the weight Wi are repeated a number of times, which makes the deep neural network learn.

After the learning, the weight Wi retained as it is without being subjected to rounding is made to "0", to thereby create a neural network having sparse weights.

This Embodiment

Figure 15:
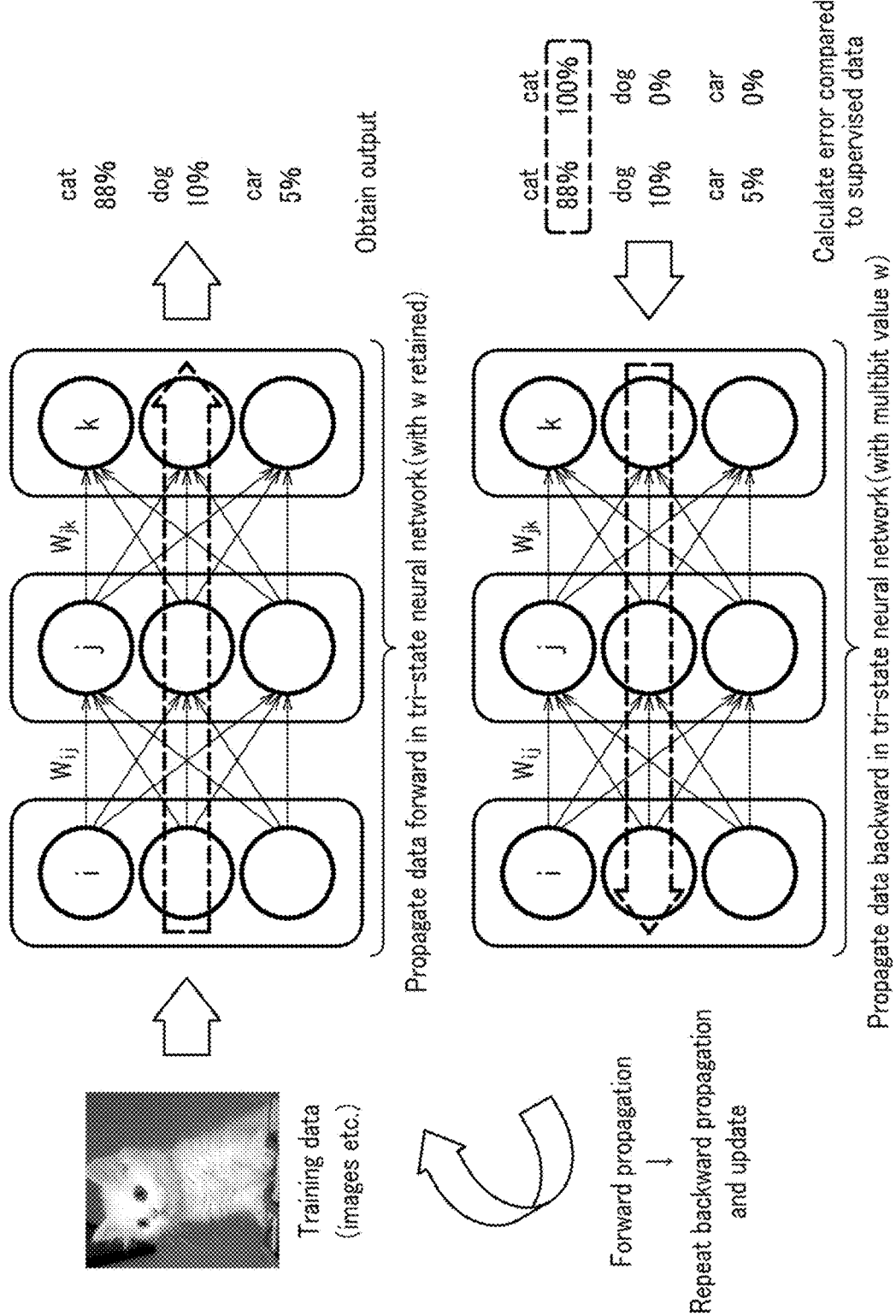
FIG. 15 is a diagram for explaining how a tri-state neural network in a deep neural network learns according to the embodiment.
Figure 16:
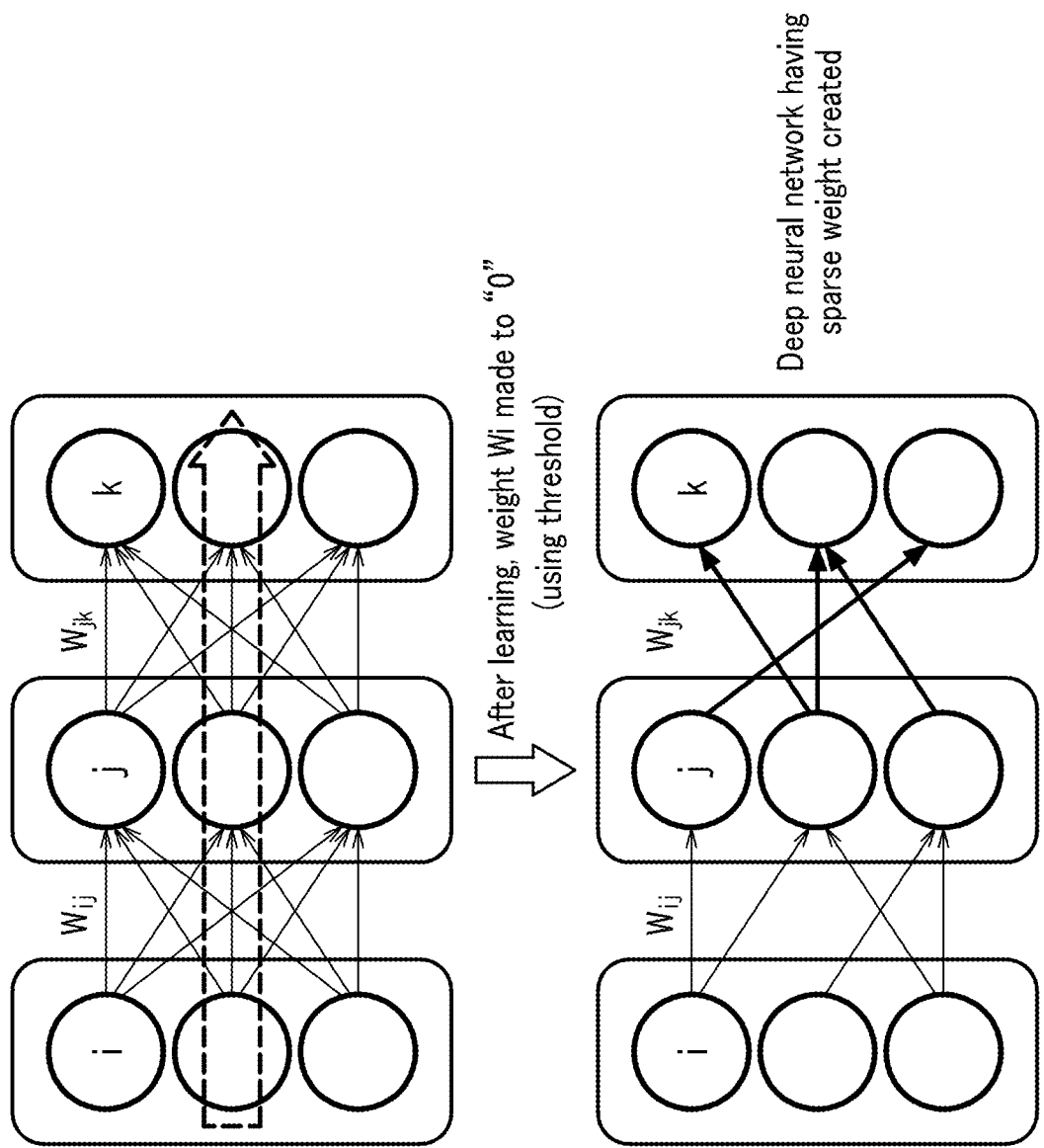
FIG. 16 is a diagram for explaining how a tri-state neural network learns according to the embodiment.

FIG. 15 and FIG. 16 are each a diagram for explaining how a tri-state neural network learns according to the embodiment. For example, the tri-state neural network circuit 200 illustrated in FIG. 5 is used as the tri-state neural network.

When the tri-state neural network circuit 200 repeats such learning in which: an error between an output obtained by forward propagation in a neural network and a training data, is calculated; the calculated error propagate backward therein; and a weight Wi is thereby updated, then, the weight Wi is not subjected to rounding at least in an intermediate layer, until the learning is terminated.

As illustrated in an upper section of FIG. 15, training data (images in many cases) is subjected to a tri-stated forward propagation. The weight Wi is maintained as it is in the tri-state neural network. An output of "a cat: 88%, a dog: 10%, and a car: 5%" is obtained from the tri-state neural network.

As illustrated in a lower section of FIG. 15, in the tri-state neural network, a supervised data of "the cat: 100%, the dog: 0%, and the car: 0%" is inputted, and an error compared with the output after the forward propagation is calculated. An error compared with the supervised data is inputted into a node in an output layer of the tri-state neural network; and is backward propagated in the tri-state neural network; and the weight Wi is updated. The weight Wi continues to have a multibit value.

The forward and backward propagations and the update of the weight Wi are repeated a number of times, which makes the deep neural network learn.

When the tri-state neural network circuit 200 repeats such learning in which: an error between an output obtained by forward propagation in the neural network and a training data is calculated; the calculated error propagate backward therein; and a weight Wi is thereby updated, then, after the learning, the weight Wi maintained as it is without being subjected to rounding is made to "0", to thereby create a neural network having sparse weights.

As illustrated in an upper section of FIG. 16, after the learning, the weight Wi is made to be "0" using a threshold.

As indicated by arrows in a lower section of FIG. 16, a deep neural network having sparse weights is created.

[Recognition Accuracy in this Embodiment]

Next is described how a recognition accuracy can be improved in a tri-state neural network according to this embodiment.

Figure 17:
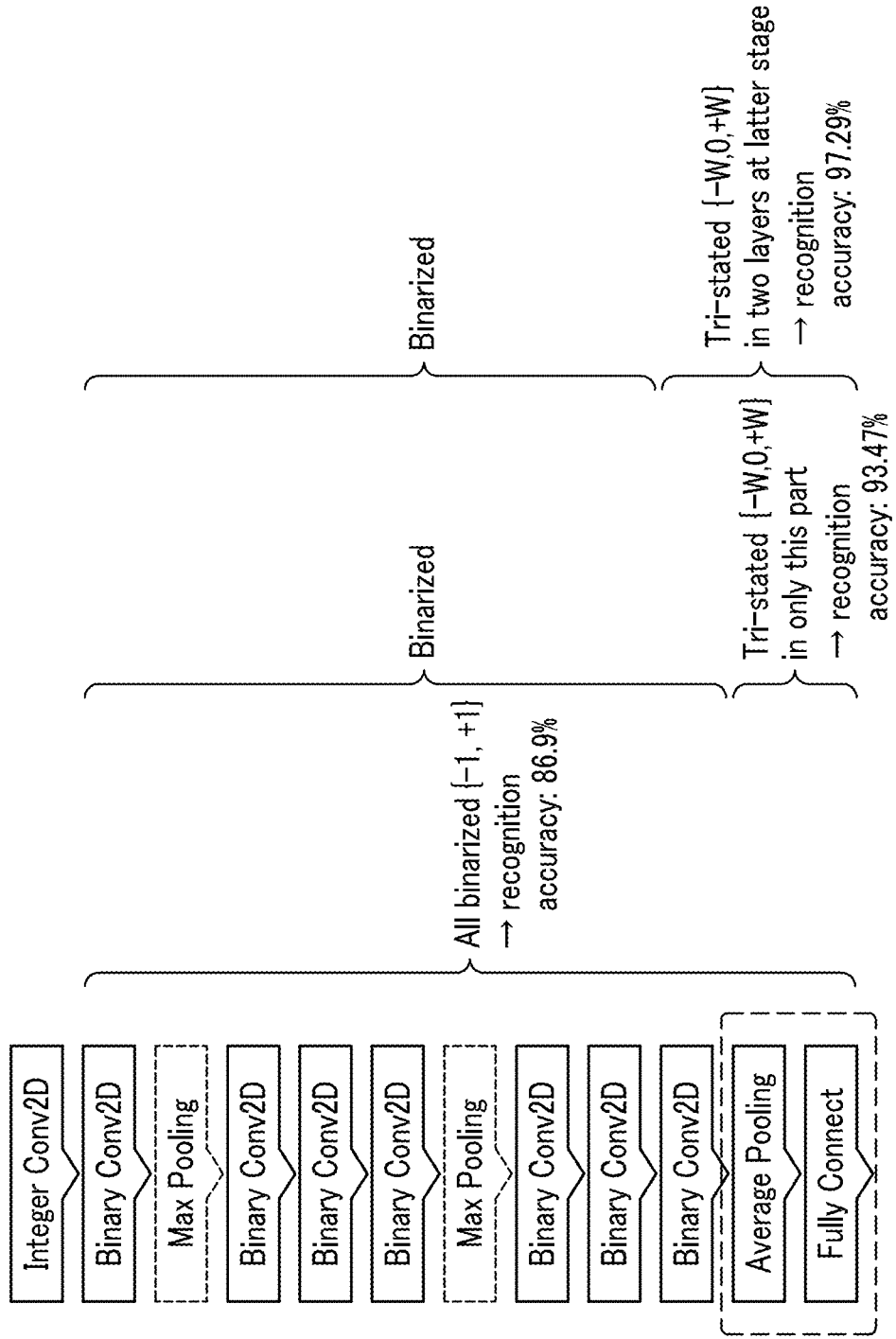
FIG. 17 is a diagram for explaining how a recognition accuracy is improved in a tri-state neural network in a deep neural network according to the embodiment.

FIG. 17 is a diagram for explaining how a recognition accuracy is improved in a tri-state neural network.

Evaluation was made using VGG11. Images used herein conformed to Pascal VOC2007.

A neural network used herein performed processings illustrated in left columns of FIG. 17, namely, Integer Conv2D, Binary Conv2D, Max Pooling, Binary Conv2Dx3, Max Pooling, Binary Conv2Dx3, Average Pooling, and Fully Connect.

When, except for Integer Conv2D, all of Binary Conv2D, Max Pooling, Binary Conv2D×3, Max Pooling, Binary Conv2D×3, Average Pooling, and Fully Connect were binarized {−1, +1}, a recognition accuracy was 86.9%.

When Binary Conv2D, Max Pooling, Binary Conv2D×3, Max Pooling, and Binary Conv2D×3 were binarized {−1, +1} and Average Pooling and Fully Connect were tri-stated {−w, 0, +w}, a recognition accuracy was 93.47%.

When Binary Conv2D, Max Pooling, Binary Conv2D×3, Max Pooling, and Binary Conv2D×2 were binarized {−1, +1} and Binary Conv2D, Average Pooling, and Fully Connect were tri-stated {−w, 0, +w}, a recognition accuracy was 97.29%.

[Verification of Object Detection]

Next is described a combination of a tri-state neural network circuit and a ternary neural network circuit according to this embodiment.

Figure 18:
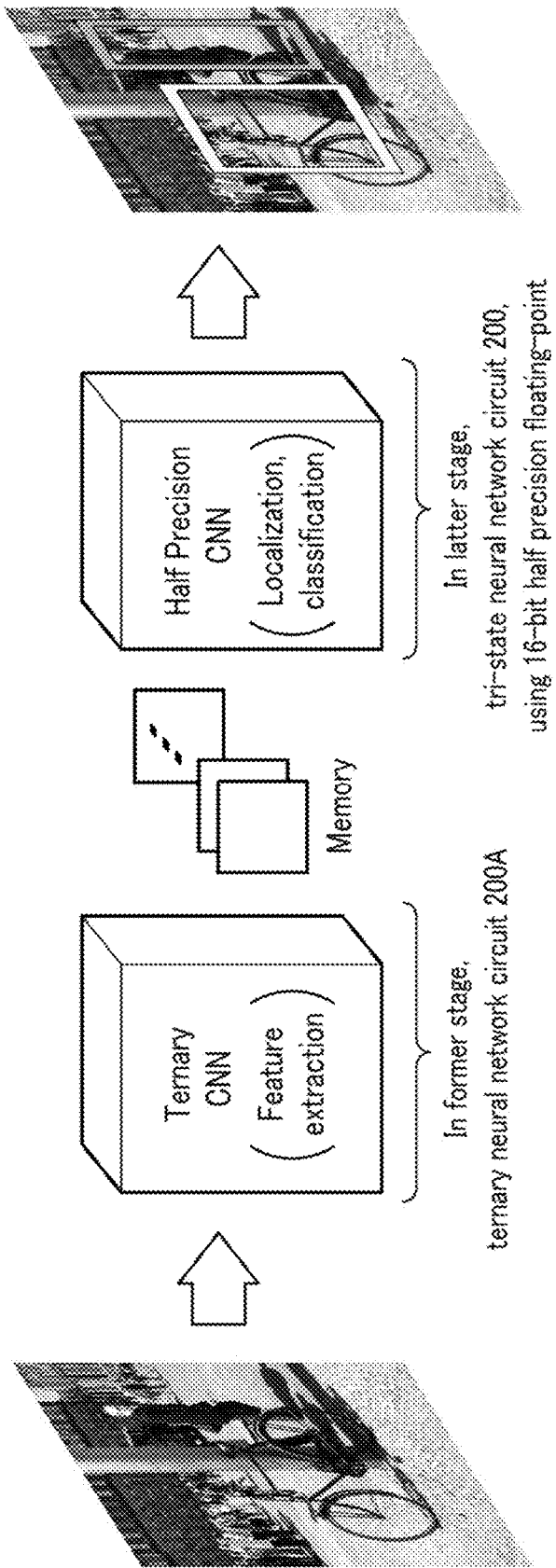
FIG. 18 is a diagram for explaining a verification example of an object detection, using a combination of a tri-state neural network circuit and a ternary neural network circuit in a deep neural network according to the embodiment.

FIG. 18 is a diagram for explaining a verification example of an object detection, using a combination of a tri-state neural network circuit and a ternary neural network circuit.

In the example, an object detection neural network YOLOv2 is implemented by a tri-state neural network.

As illustrated in FIG. 18, the ternary neural network circuit 200A at a former stage is combined via a memory with the tri-state neural network circuit 200 at a latter stage.

The ternary neural network circuit 200A at the former stage was implemented by TernaryCNN (feature extraction) as a neural network. The tri-state neural network circuit 200 at the latter stage was implemented by Half PrecisionCNN (localization, classification). The tri-state neural network circuit 200 used 16-bit half precision floating-point.

When the object detection neural network YOLOv2 was implemented by the tri-state neural network, the following was obtained.

(1) Even when tri-stated, the recognition accuracy was almost the same.
(2) About 92% of the weights Wi was successfully skipped (made to be "0").
(3) About 92% of an amount of memory was reduced. As a result, a recognition speed of 36.50 FPS (Frames Per Second) was achieved.

[Comparative Example Using Other Device]

Next is described a comparison between a tri-state neural network circuit according to this embodiment and the object recognition algorithm YOLOv2.

FIG. 19 is a diagram for explaining a comparison between a tri-state neural network circuit according to the embodiment of the present invention and the object recognition algorithm YOLOv2.

The tri-state neural network circuit according to the embodiment was compared with the object recognition algorithm YOLOv2.

mCPU (ARM Cortex A57) and mGPU (NVidia Pascal GPU): Jetson TX2 board were used. Zynq Ultrascale+ MPSoC zcu102 board was used as FPGA.

Compared with ARM Cortex-A57, the tri-state neural network circuit of the present invention was 158.7 times faster, 1.1 times less in power consumption, and 182.80 times more efficient in power performance.

Compared with NVidia Pascal embedded GPU, the tri-state neural network circuit of the present invention was 24.6 times faster, 2.0 times less in power consumption, and 49.38 times more efficient in power performance.

[Example of Implementation]

FIG. 20 is a diagram for explaining an example of implementing a tri-state neural network circuit according to the embodiment of the present invention.

<Step1>

A given dataset (ImageNet which is data for image recognition tasks) is trained on a computer 201 having a GPU (Graphics Processing Unit), using Chainer (registered trademark) which is existing framework software for deep neural network. Learning is conducted in the GPU. The computer 201 includes: a CPU (Central Processing Unit) such as an ARM processor; a memory; a storage unit (a storage part) such as a hard disk; and an I/O port including a network interface. The CPU of the computer 201 executes a program loaded in the memory (an execution program of a binarized neural network), to thereby make a control part (a control unit) composed of processing units to be described later operate.

<Step2>

A C++ code equivalent to the tri-state neural network circuit 200 according to this embodiment is automatically generated by using an auto-generation tool, to thereby obtain a C++ code 202.

<Step3>

HDL (hardware description language) 203 is created for synthesizing a FPGA (field-programmable gate array), using a high level synthesis tool by a FPGA vendor (SDSoC manufactured by Xilinx, Inc.) (registered trademark). For example, in the high level synthesis tool (SDSoC developed by Xilinx Inc.), a logic circuit desired to be implemented is described using a hardware description language (Verilog HDL/VHDL), which is then synthesized into a bitstream using a CAD tool provided. The bitstream is transmitted to the FPGA, to thereby implement the desired circuit in the FPGA.

<Step4>

The tri-state neural network circuit 200 is then implemented in the FPGA (FPGA synthesis 204), and image recognition is verified using a conventional FPGA synthesis tool, Vivado (registered trademark).

<Step5>

After verification, a board 205 is completed. The tri-state neural network circuit 200 is converted into hardware and is implemented on the board 205.

As described above, the tri-state neural network circuit 200 (see FIG. 5) according to this embodiment includes, in an intermediate layer: an input value Xi to which convolution is applied; the nonzero convolution operation circuit 21 configured to receive an input of a weight Wi and to perform a nonzero convolution operation; the sum circuit 22 (see FIG. 2) configured to sum up each of values obtained by the nonzero convolution operation and a bias W0; and the activating function circuit 23 configured to convert a signal Y generated by taking the sum, using an activating function f(u). The nonzero convolution operation circuit 21: skips a weight Wi having a zero weight; and performs a convolution operation based on a nonzero weight and an input value Xi corresponding to the nonzero weight.

The above-described configuration makes it possible to drastically reduce an absolute number of multiply-accumulate operations in performing a convolution operation, thus allowing a reduction in an amount of memory and a high-speed calculation time. A working example results in a 95% reduction (down to one twentieth) of a computation time in performing a convolution operation.

Only by making use of such a high-speed calculation time and a reduction in a memory area, a neural network is achieved which can reduce an amount of memory and can be on-chip packaged.

The tri-state neural network circuit 200 having a multibit weight W (for example, 8 to 16-bit±w and "0") takes advantage of a high recognition accuracy and a wide range of usage (application), to thereby drastically reduce an amount of memory and to achieve an on-chip implementation. An on-chip structure (near-memory) has advantageous effects of a high bandwidth (about 100 times faster than off-chip) and a low power consumption (about 33 times lower than off-chip).

When the tri-state neural network circuit 200 learns by repeatedly calculating an error between an output obtained by forward propagation in a neural network and a training data, subjecting the calculated error to backward propagation therein, and updating a weight Wi, then, after the learning, the tri-state neural network circuit 200 makes the weight Wi which has been retained without being subjected to rounding, into "0" using a threshold, to thereby create a neural network having sparse weights.

A CNN in a deep neural network herein is designed to have a circuit configuration in which: by utilizing a feature that a weighting function for performing a convolution operation is sparse (has a number of zeros), the weighting function is represented by a relative address therein; and only a nonzero weight part is subjected to computation. This can drastically reduce an amount of calculation in a tri-state (0, ±multibit) neural network.

Application of the present invention makes it possible to achieve a general object recognition, semantic segmentation, self-location estimation, or the like which deal with a multibit analogue quantity, on a real-time basis.

The ternary neural network circuit 200A (see FIG. 6) makes it possible to, owing to ternarization thereof, achieve an about 95% reduction (a weight made to "0") and a speed-up of about 3 to about 4 times, while improving a recognition accuracy by about 1 to about 2%, compared with a binarized neural network.

Note that Patent Document 2 discloses a technology in which a coefficient of zero is removed, while a nonzero coefficient is multibit (typically, 32-bit floating point precision). In the present invention, meanwhile, as illustrated in FIG. 12, a coefficient is made to zero, and, at the same time, a bit size is reduced (to 1 bit), thus allowing an amount of memory to be significantly reduced. Also, unlike the present invention, Patent Document 2 fails to have such a technical idea that, when a neural network learns by repeatedly updating a weight Wi through backward propagation, then, after the learning, the weight Wi which has been retained without being subjected to rounding is made to "0" using a threshold, to thereby create a neural network having sparse weights.

The present invention is not limited to the above-described embodiment and includes other variations and modifications as long as those do not depart from the gist of the present invention described in claims.

The above-detailed embodiments are intended to be illustrative of the present invention in an easily understandable manner and the present invention is not limited to that includes all of the components explained in the embodiments. Part of a configuration of an embodiment can be substituted by or added to that of another embodiment. An exemplary embodiment can be carried out in other various embodiments, and various omissions, substitutions, and changes are possible within a scope not departing from the gist of the present invention. Those embodiments and variations are included in claims or an abstract and are also included in the inventions described in claims as well as within a range equivalent to those claims.

Among each of the processings explained in the embodiment, all or part of the processing explained as being performed automatically can be performed manually instead. Or, all or part of the processing explained as being performed manually can be performed automatically by a known method. Information including a processing procedure, a control procedure, a specific name, and various types of data and parameters illustrated in the specification or in the drawings can be optionally changed, unless otherwise specified.

The constituent elements of the devices illustrated in the drawings are functionally conceptual and are not necessarily structured as physically illustrated. That is, a specific configuration of distribution and integration of the devices is not limited to those as illustrated, and all or part thereof can be structured by functionally or physically distributing or integrating in any appropriate unit, depending on various types of load and status of usage.

Part or all of a configuration, a function, a processing part, a processing unit, or the like described above can be realized by hardware by means of, for example, designing using an integrated circuit. The aforementioned configuration, function, or the like can be embodied by software in which a processor interprets and executes a program which realizes the function. Information such as a program, a table, a file, and the like for realizing such a function can be stored in a storage device including a memory, a hard disk, and a SSD (Solid State Drive) or in a storage medium including an IC (Integrated Circuit) card, a SD (Secure Digital) card, and an optical disc.

In the above-described embodiments, the device is named as a neural network circuit device. The name is, however, used for purpose of illustration and may be a deep neural network circuit, a neural network device, a perceptron, or the like. In the above-described embodiments, the method and the program are named as the neural network processing method. The name may be instead a neural network computing method, a neural net program, or the like.

DESCRIPTION OF REFERENCE NUMERALS 1 deep neural network
2, 20 neural network circuit
11 input layer
12 hidden layer (intermediate layer)
13 output layer
21, 21A nonzero convolution operation circuit (convolution operation circuit)
22 sum circuit
23, 221, 221A activating function circuit
200 tri-state neural network circuit (neural network circuit device)
200A ternary neural network circuit (neural network circuit device)
211 counter
212, 217, 219 register
213 weight/address memory (first storage part)
214, 222 adder
215 address/data memory (second storage part)
216 integration circuit
216A XNOR gate circuit
222, 222A sequential MAC unit
Xi input value
Wi weight

The invention claimed is:
1. A neural network circuit device including at least an input layer, one or more intermediate layers, and an output layer, the neural network circuit device comprising, in the one or more intermediate layers:

an input value Xi to which convolution is applied;
a convolution operation circuit configured to receive a weight Wi and to perform a convolution operation thereof;
a sum circuit configured to take a sum of operation values each subjected to the convolution operation and a bias W0; and
an activating function circuit configured to convert a signal Y generated by taking the sum, using an activating function f(u),
wherein the convolution operation circuit is configured to skip a weight Wi having a zero weight and to perform a convolution operation based on a nonzero weight and an input value Xi corresponding thereto.

2. A neural network circuit device including at least an input layer, one or more intermediate layers, and an output layer, the one or more intermediate layer including a first intermediate layer and a second intermediate layer, the neural network circuit device comprising, in each of the first intermediate layer and the second intermediate layer:
a convolution operation circuit configured to receive a weight Wi and perform a convolution operation thereof;
a sum circuit configured to take a sum of operation values each subjected to the convolution operation and a bias W0; and
an activating function circuit configured to convert a signal Y generated by taking the sum, using an activating function f(u),
wherein, in the convolution operation circuit in the first intermediate layer, a tri-state {−multibit, 0, +multibit} weight Wi skips a zero weight, and a convolution operation is performed based on a nonzero weight and an input value Xi corresponding thereto, and
wherein, in the convolution operation circuit in the second intermediate layer, a ternary {−1, 0, +1} or a binary {−1, +1} weight Wi skips a zero weight, and a convolution operation is performed based on a nonzero weight and an input value Xi corresponding to the nonzero weight.

3. The neural network circuit device according to claim 1, wherein the convolution operation circuit is configured to perform a convolution operation of a tri-state {−W (multibit), 0, +W (multibit} weight Wi and an input value Xi.

4. The neural network circuit device according to claim 1, wherein the weight Wi in the convolution operation circuit is expressed by Formula as follows:

$$W_i = \begin{cases} W_{hid} & W_{hid} < \rho \\ 0 & -\rho \leq W_{hid} < \rho \\ W_{hid} & \rho \leq W_{hid} \end{cases} \quad (3)$$

wherein, Whid: multibit weight Wi, and ρ: threshold.

5. The neural network circuit device according to claim 1, wherein the convolution operation circuit is configured to perform a convolution operation of a ternary {−1, 0, +1} weight Wi and an input value Xi.

6. The neural network circuit device according to claim 1, wherein the convolution operation circuit is configured to perform a convolution operation a binary {−1, +1} weight Wi and an input value Xi.

7. The neural network circuit device according to claim 1, wherein the convolution operation circuit includes: a first storage part that stores therein a nonzero weight and a relative address of an input value X to which convolution is applied; and a second storage part that stores therein an address of the input value Xi, and
wherein the convolution operation circuit is configured to, in performing an operation in which a zero weight is skipped,
retrieve a nonzero weight and a relative address corresponding thereto, from the first storage part,
reference the second storage part and retrieve therefrom a subsequent input value X to which convolution is applied, using the retrieved relative address and a current address, and
perform a convolution operation based on the input value Xi retrieved from the second storage part and a nonzero weight corresponding thereto.

8. The neural network circuit device according to claim 1, wherein the convolution operation circuit includes a third storage part that stores therein a nonzero weight and an absolute address of an input value X to which convolution is applied, and
wherein the convolution operation circuit is configured to, in performing an operation in which a zero weight is skipped,
specify an absolute address of interest in the third storage part and retrieve a nonzero weight and an input value Xi each corresponding thereto, and
perform a convolution operation based on the retrieved input value Xi and the nonzero weight corresponding thereto.

9. The neural network circuit device according to claim 1, wherein, when learning is repeated in which: an error between an output obtained by forward propagation in a neural network and a training data is calculated; and the calculated error is subjected to backward propagation therein, based on which the weight Wi is updated, then, the weight Wi is not subjected to rounding at least in the intermediate layer, until the learning is terminated.

10. The neural network circuit device according to claim 1, wherein, when learning is repeated in which: an error between an output obtained by forward propagation in a neural network and a training data is calculated; and the calculated error is subjected to backward propagation therein, based on which the weight Wi is updated, then, after the learning is terminated, the weight Wi having been maintained without being subjected to rounding is made to zero, to thereby create a neural network having sparse weights.

11. A neural network processing method of a neural network circuit device including at least an input layer, one or more intermediate layers, and an output layer, the neural network circuit method comprising, in the one or more intermediate layers:
a convolution operation step of receiving an input value X to which convolution is applied, and a weight Wi, and performing a convolution operation thereof;
a step of taking a sum of operation values each subjected to the convolution operation and a bias W0; and
a step of converting a signal Y generated by taking the sum, using an activating function f(u),
wherein, in the convolution operation step, a weight Wi having a zero weight is skipped, and a convolution operation is performed based on a nonzero weight and an input value Xi corresponding thereto.

12. The neural network processing method according to claim 11, wherein, when learning is repeated in which: an error between an output obtained by forward propagation in a neural network and a training data is calculated; and the calculated error is subjected to backward propagation therein, based on which the weight Wi is updated, then, the weight Wi is not subjected to rounding at least in the intermediate layer, until the learning is terminated.

13. The neural network processing method according to claim 11, wherein, when learning is repeated in which: an error between an output obtained by forward propagating in a neural network and a training data is calculated; and the calculated error is subjected to backward propagation therein, based on which the weight Wi is updated, then, after the learning is terminated, the weight Wi having been maintained without being subjected to rounding is made to zero, to thereby create a neural network having sparse weights.

14. A neural network execution program causing a computer to serve as a neural network circuit device, the neural network circuit device including at least an input layer, one or more intermediate layers, and an output layer, the neural network execution program realizing functions, in the intermediate layer, of:

a convolution operation circuit part configured to receive an input value X to which convolution is applied, and a weight Wi, and to perform a convolution operation thereof;

a sum circuit part configured to take a sum of operation values each subjected to the convolution operation and a bias W0; and an activating function circuit part configured to convert a signal Y generated by taking the sum, using an activating function f(u), wherein the convolution operation circuit part is configured to skip a weight Wi having a zero weight and to perform a convolution operation based on a nonzero weight and an input value Xi corresponding thereto.

15. The neural network circuit device according to claim 2, wherein the convolution operation circuit includes: a first storage part that stores therein a nonzero weight and a relative address of an input value X to which convolution is applied; and a second storage part that stores therein an address of the input value Xi, and wherein the convolution operation circuit is configured to, in performing an operation in which a zero weight is skipped, retrieve a nonzero weight and a relative address corresponding thereto, from the first storage part, reference the second storage part and retrieve therefrom a subsequent input value X to which convolution is applied, using the retrieved relative address and a current address, and perform a convolution operation based on the input value Xi retrieved from the second storage part and a nonzero weight corresponding thereto.

16. The neural network circuit device according to claim 2, wherein the convolution operation circuit includes a third storage part that stores therein a nonzero weight and an absolute address of an input value X to which convolution is applied, and wherein the convolution operation circuit is configured to, in performing an operation in which a zero weight is skipped, specify an absolute address of interest in the third storage part and retrieve a nonzero weight and an input value Xi each corresponding thereto, and perform a convolution operation based on the retrieved input value Xi and the nonzero weight corresponding thereto.

17. The neural network circuit device according to claim 2, wherein, when learning is repeated in which: an error between an output obtained by forward propagation in a neural network and a training data is calculated; and the calculated error is subjected to backward propagation therein, based on which the weight Wi is updated, then, the weight Wi is not subjected to rounding at least in the intermediate layer, until the learning is terminated.

18. The neural network circuit device according to claim 2, wherein, when learning is repeated in which: an error between an output obtained by forward propagation in a neural network and a training data is calculated; and the calculated error is subjected to backward propagation therein, based on which the weight Wi is updated, then, after the learning is terminated, the weight Wi having been maintained without being subjected to rounding is made to zero, to thereby create a neural network having sparse weights.

* * * * *